United States Patent [19]

Nanjo et al.

[11] Patent Number: 5,778,361
[45] Date of Patent: Jul. 7, 1998

[54] METHOD AND SYSTEM FOR FAST INDEXING AND SEARCHING OF TEXT IN COMPOUND-WORD LANGUAGES

[75] Inventors: Tsutomu Nanjo, Chofu, Japan; William Jones, Kirkland, Wash.

[73] Assignee: Microsoft Corporation, Redmond, Wash.

[21] Appl. No.: 537,366

[22] Filed: Sep. 29, 1995

[51] Int. Cl.$^6$ .................................................... G06F 17/30
[52] U.S. Cl. ........................................ 707/5; 707/2; 707/3
[58] Field of Search ................................. 395/602, 603, 395/600, 150, 605; 364/419.14, 419.09; 382/185; 341/22; 400/110; 707/2, 3, 5

[56] References Cited

U.S. PATENT DOCUMENTS

| | | | |
|---|---|---|---|
| 4,064,983 | 12/1977 | Inose et al. | 197/1 |
| 4,602,878 | 7/1986 | Merner et al. | 400/110 |
| 4,679,951 | 7/1987 | King et al. | 400/110 |
| 5,109,352 | 4/1992 | O'dell | 395/150 |
| 5,148,541 | 9/1992 | Lee et al. | 395/600 |
| 5,168,533 | 12/1992 | Kato et al. | 364/200 |
| 5,187,480 | 2/1993 | Thomas et al. | 341/22 |
| 5,276,616 | 1/1994 | Kuga et al. | 364/419.08 |
| 5,329,506 | 7/1994 | Kitta et al. | 369/32 |
| 5,331,557 | 7/1994 | Liu | 364/419.09 |
| 5,337,233 | 8/1994 | Hofert et al. | 364/419.14 |
| 5,384,700 | 1/1995 | Lim et al. | 364/419.1 |
| 5,416,898 | 5/1995 | Opstad et al. | 395/150 |
| 5,537,431 | 7/1996 | Chen et al. | 371/54 |
| 5,542,090 | 7/1996 | Henderson et al. | 395/605 |
| 5,544,352 | 8/1996 | Egger | 707/5 |
| 5,586,198 | 12/1996 | Lakritz | 382/185 |
| 5,590,317 | 12/1996 | Iguchi et al. | 395/602 |
| 5,642,520 | 6/1997 | Takeshita et al. | 395/759 |

OTHER PUBLICATIONS

Makino, Beta: An Automatic Kana-Kanji Translation system, IEEE, pp. 46–52, Jan. 1985.
Morita, japanese Text Input System, IEEE, pp. 29–35, May 1985.
Chu, Chinese/Kanji Text and Data Processing, IEEE pp. 11–12, Jan. 1985.
Huang, The Input and Output of Chinese and Japanese Characters, IEEE, pp. 18–24, Jan. 1985.
Becker, Typing Chinese, Japanese and Korean, IEEE, pp. 27–34, Jan. 1985.
Matsuda, Processing Information in Japanese, IEEE, pp. 37–45, Jan. 1985.

*Primary Examiner*—Thomas G. Black
*Assistant Examiner*—Frantz Coby
*Attorney, Agent, or Firm*—Jones & Askew, LLP

[57] ABSTRACT

A method and system for fast indexing and searching of text in compound-word languages such as Japanese, Chinese, Hebrew, and Arabic. Computer codings of such compound-word languages often contain different character types, e.g. the shift-JIS coding of Japanese represents kanji, katakana, hiragana, and roman characters with different codings in the same character set, to form index terms and search terms. In a preferred embodiment, a content-index search system is invoked in response to a query on a collection of objects. The collection of objects is indexed by the content-index and may, for example, be a corpus of documents indexed by the terms contained in the documents. A content-index search system uses the content-index to generate and store an initial search result in response to the query; a direct search system is used in certain situations. The content-index contains, for each of a plurality of terms, a reference to each object. The content-index is created by first creating a preliminary index term for each plurality of terms delimited by a word separator or a character type transition in a string of characters to be indexed. For each preliminary index term of a first type, e.g. katakana or roman, the preliminary index term is utilized as an index term. For each preliminary index term of a second type, e.g. kanji, the preliminary index term is step-indexed to create a plurality of index terms of a length less than a predetermined step size. The index terms are then added to the content-index in association with the object being indexed. A string of text entered into a search engine as a search term is processed into preliminary search terms and search terms in a similar manner.

41 Claims, 12 Drawing Sheets

INDEX STRINGS

STEP INDEX

CREATE SEARCH TERMS

SEARCH

FORM KANJI SEARCH TERMS

METHOD AND SYSTEM FOR FAST INDEXING AND SEARCHING OF TEXT IN COMPOUND-WORD LANGUAGES

TECHNICAL FIELD

The present invention relates generally to a computer method and system for computer-based text indexing and searching, and, more specifically, to a computer method and system for conducting computer-based indexing and searching of text encoded in compound-word languages, that is, languages having words that are run together or lack intervening word separators, particularly, Japanese, Chinese, or other Eastern languages.

BACKGROUND OF THE INVENTION

Existing computer systems provide the capability to search a collection of documents to identify those documents that contain a certain word, or phrase, or a combination of words. For example, given a collection of documents, the computer system can return a list of the documents that contain the word "patent" or can return a list of the documents that contain the phrase "patent application." In addition, the computer system can return a list of the documents that either contain the word "patent" or contain the word "application." This list includes those documents that only contain the word "patent," those that only contain the word "application," and those that contain both words.

Such computer systems also provide the ability to efficiently find or retrieve documents in response to such queries by indexing the contents of the documents. Indexing information is typically stored in a structure referred to as a content-index. A content-index typically indexes multiple documents and includes indexing data (e.g., keywords) and reference data that refers to the documents that contain the indexing data. For example, a typical content-index may store as the indexing data each major term contained in each document. Each term is stored as a separate entry in the content-index and each entry contains a reference to the documents that contain that term. Thus, a content-index can be used to determine which documents contain a particular term.

A content-index is typically stored in an efficient data structure, such as a hash table or binary tree (B-tree), so that information can be retrieved efficiently in response to queries. A typical content-index can be used to answer simple queries involving the use of an indexed term verbatim, as a prefix, or as specifying a range. For example, if the indexed term is the word "second," then the content-index can be used to find all documents that contain the word "second." Also, the content-index can be used to find all documents containing the word "second" as a prefix, by using a query term such as "second*", where "*" is a wildcard character. For example, a document containing the word "secondary" would satisfy (match) the query. Also, for example, if the indexed term is a range, for example, "second—fourth," then a document containing the word "third" would satisfy the query. Such queries involve a simple lookup of the term in the content-index and the retrieval of the set of documents that contain the indexed term or a term within the specified range.

Each different language lends certain complications to creating content-indexes or searching. For example, written Japanese consists of a mixture of several types of symbols, each with its own function. The kanji characters are picturegraphic-idiographic characters adopted from the Chinese language, and are used for conceptual words and indigenous names. The kana, which consists of hiragana and katakana, are phonetic symbols developed in Japan. Each symbol represents the sound of one syllable. Hiragana is used to write the inflectional endings of conceptual words written in kanji, as well as types of native words not written in kanji, while katakana are used chiefly for words of foreign origin. Besides these symbols, one often finds roman letters and arabic numerals in Japanese text.

As with other languages, symbols representing characters in the Japanese language can be represented by a series of bits, in a manner similar to that in which an 8-bit byte is used to represent ASCII characters. Given a particular coding scheme, a table can be constructed that translates a given code into an appropriate character of the language for display on a display screen or printing by a printer.

Japanese, Chinese, and other languages have far more symbols than English; the mere addition of numbers of symbols affects indexing and searching efficiency. With Japanese, as of 1981 the Japanese language consisted of approximately 1,900 kanji characters, in addition to the 46 hiragana characters and 46 katakana characters. This large number of characters cannot be encoded with a single 8-bit byte, so more complex encoding schemes are required.

A popular encoding scheme for Japanese is called shift-JIS (Japanese Industrial Standard). The shift-JIS Japanese code is an 8-bit code which is primarily used for internal processing of Japanese on various computer platforms. Details about the relationship between the 8-bit codes and the Japanese symbols may be found in the document entitled *Understanding Japanese Information Processing*, by Ken Lunde (O'Reilly & Associates, Inc., 1993), ISBN 1565920430. Which is incorporated herein by reference and made a part hereof.

As can be see in the referenced publication, there are both one-byte-per-character and two-byte-per-character modes in the shift-JIS representation. The two-byte-per-character mode is initiated when a byte with a decimal value ranging between 129–159 or 224–239 is received. Either of these bytes are subsequently treated as the first byte of an expected two-byte sequence. The following or second byte must be a byte with a decimal value ranging between 64–252 (but not 127, the delete DEL character). Note that the first byte's range falls entirely in the extended ASCII character set, which are true 8-bit characters.

Thus, the shift-JIS encoding scheme for Japanese, which consists of one or two-byte sequences, can represent kanji, katakana, hiragana, and roman characters ("character types"). However, a search within or an index to a Japanese text file encoded in shift-JIS is complicated by the fact that there are no intervening word separators.

In a typical search, a user wants to find documents that contain one or more words or word level concepts. In most languages, words are consistently separated by word separator characters such as a space, comma, period, etc., and hence are easy to identify. However, in compound word languages such as Japanese and Chinese, words are not reliably separated by word separator characters. A string of katakana or kanji characters in Japanese, for example, typically contains two, three or more symbols with no word separator characters in between. Native speakers use their knowledge of word meaning and context to figure out where the word boundaries are.

The large number of characters in languages such as Japanese and Chinese, coupled with the difficulty of isolating words for purposes of indexing or searching, creates significant demands on computer resources in terms of disk space, memory, processing time. The present invention seeks to provide an efficient method and system for indexing and searching on documents encoded in such compound-word languages.

SUMMARY OF THE INVENTION

The present invention provides an improved computer-based method and system for efficient indexing and searching of objects——such as files, documents, or a collection of documents——represented in a code for a compound word languages such as Japanese or Chinese, especially encodings such as shift-JIS that uses the same code represent different character types within a given character set. The method is not dictionary-based and requires no special understanding of the language being indexed or searched.

In the preferred environment for indexing, the system creates a content-index that indexes a collection of objects; this index is stored in a computer system.

In response to a query, an initial search result is generated using the content-index and stored. The stored search result contains references to objects in the collection that match a search criteria specified in the query. Once the search result is initially generated using the content-index, the results (i.e. a list of files or documents that satisfy the search criteria) are displayed to the user. In other cases, a direct search (that is, a search that compares an symbol search key to the entire contents of each file or document, taking groupings of n symbols) is conducted.

In accordance with the invention, a content index is created by generating a reference to each object that contains an index term by first creating a preliminary index term for each of a plurality of terms. A term includes only characters that can occur within a word. In addition, all characters of a term are of the same type. Character types for Japanese are Kanji, Katakana, Hiragana and Roman (characters that are used in English and other Western languages). Numerals count as word characters. Characters that cannot occur within a word—such as the space, comma and other word separators—are ignored. These characters are never included in terms. After or during the process to create preliminary terms, all preliminary terms go through a process of normalization discussed in more detail later in this document.

After normalization, some terms go directly into the index with no further processing. These are terms of a "first type". Using Japanese as an example, terms of a first type are Roman and Katakana terms. Kanji terms are of a second type that must go through an additional process of step indexing. For each preliminary index term of a second type, the system step-indexes the symbols in the preliminary index term to create a plurality of index terms of a length less than a predetermined step size.

In the current implementation for Japanese, Hiragana terms are treated as stop words and are not included in the index. alternative embodiments of the present invention may include a stop word list of Japanese words. For implementations with a stop word list, all terms that are not in the stop word list, including Hiragana terms, will be included in the index.

The content index is then created by associating the object with each of the index terms generated in the above manner. After creating the content index, the content index can be used to generate search results in the known manner.

A system constructed in accordance with the invention comprises two primary parts——first is a module that accepts textual input from various filters that handles documents and other files stored in a predetermined format. This module creates preliminary index terms that are processed further to create index terms.

Second, the invention further includes a token maker that creates the index terms from the preliminary index terms. String indexing and searching is used to handle words encoded in katakana or hiragana or roman symbols, and step indexing and searching is used for handling certain types of strings such as kanji, by breaking collections of symbols into substrings of a relatively small number. The token maker produces tokens as an output, which map to terms (keys) of an index. The tokens of a document map to corresponding term or document associations in the index. The term/document associations in the index are preferably organized (sorted) by the terms, much in the same way that word and subject references in an index of a book are alphabetically ordered. The index is then used to quickly locate all document associations to a given term.

Stated in other words, the invention comprises word breaking——creating preliminary index terms——based on simple character level rules such as looking for character type transitions within a character set or looking for word separators (if any) that may be encountered in the text to be indexed or searched. Then, a normalization process is conducted to add to or replace characters in the file. Sometimes two characters or character combinations may be used interchangeably in a certain language. For example, variations between upper and lower case in the English language do not usually have much impact on meaning. Normalizing to a single case makes the index smaller. The next step is to remove noise or stop words, which are tokens that occur so frequently in the particular language that indexing or searching on such terms in usually unproductive. For example, in the English language such stop words include "the", "of", "and", etc. Finally, the steps of step indexing and searching, and string indexing and searching are carried out.

Accordingly, it is an object of the invention to provide an improved method and system for fast indexing and searching for documents encoded in compound-word languages.

It is another object of the invention to provide an improved method and system for fast indexing and searching on documents encoded in shift-JIS Japanese representations.

It is another object of the invention to provide a content-index creating and searching system that can be readily incorporated into existing computer-based indexing and searching systems.

These and other objects, features, and advantages of the present invention may be more clearly understood and appreciated from a review of the following detailed description and by reference to the appended drawings and claims.

DETAILED DESCRIPTION OF THE PREFERRED EMBODIMENTS

Figure 1:
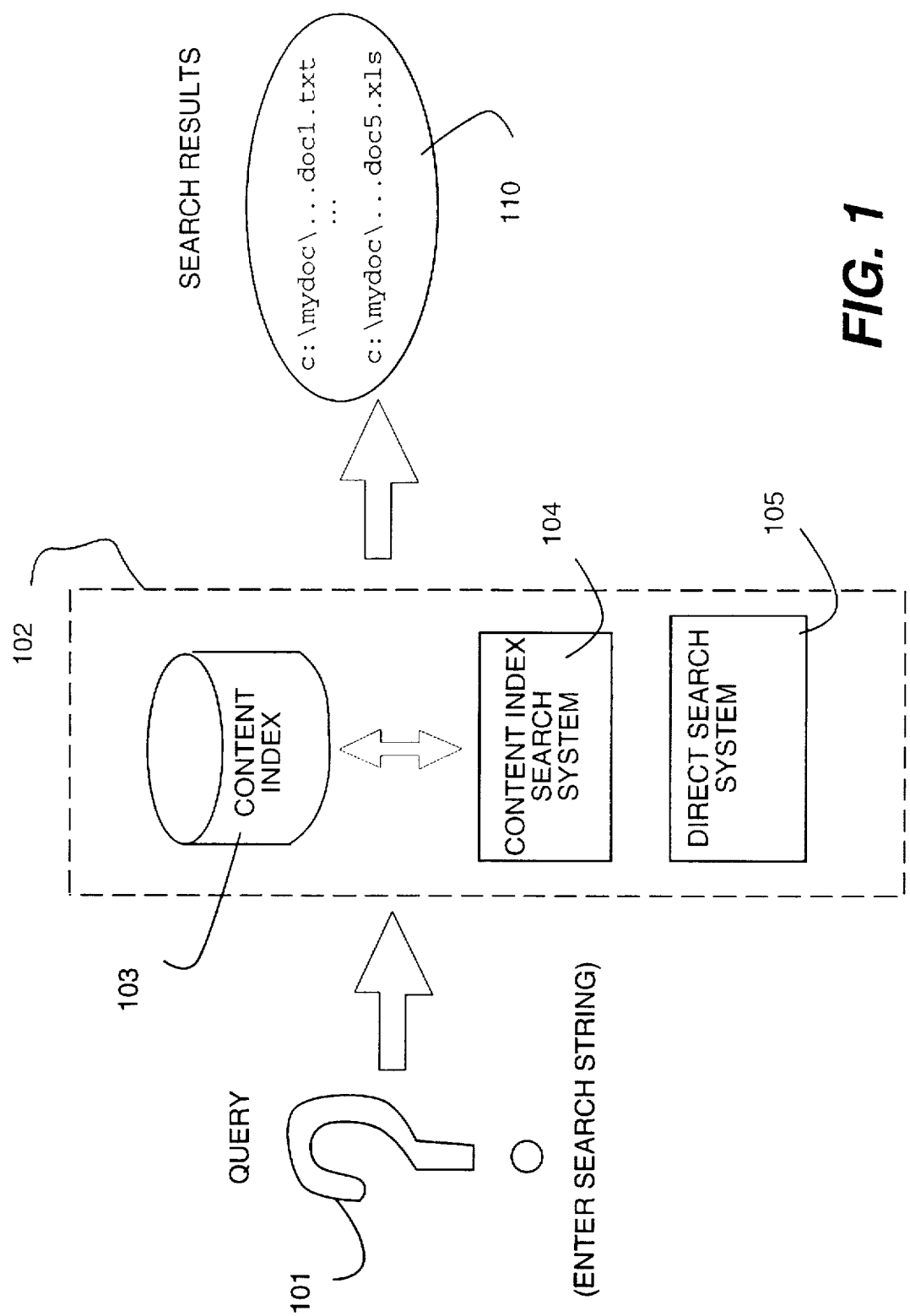
FIG. 1 is an overview block diagram of the process used to generate search results with a content-index.

The present invention provides methods and systems for generating a search result that identifies objects that satisfy a search criteria, especially for text and compound-word languages such as Japanese or Chinese. According to the invention, a user or a query program generates a queries regarding objects that are indexed by the content-index. In response, a search system or engine responsible for executing the query uses the content index in certain cases to generate a search result, and in other instances conducts a direct search on the collection of objects. The generation of the search results is accomplished using well-known mechanisms, such as searching the content-index for the indexing terms specified by the search criteria and retrieving references to objects that contains those terms as indicated by the content-index.

In accordance with the invention, the content index is created by generating a reference to each object that contains an index term by first creating a preliminary index term for each of a plurality of terms delimited by a word separator or a character-type transition. For each preliminary index term of a first type, the preliminary index term is used as an index term. For each preliminary index term of a second type, the system step-indexes the symbols in the preliminary index term to create a plurality of index terms or tokens of a length less than or equal to a predetermined step size. The content index is then created by associating the object with each of the index terms or tokens generated in the above manner. After creating the content index, the content index can be used to generate search results in the known manner.

In particular, in compound word languages such as Japanese and Chinese, certain characteristics in a string of characters in a text buffer (that is, an object to be indexed) are examined to determined the location of known character separators or character type transitions. This initial word breaking creates preliminary index terms that are then normalized to create a second set of preliminary index terms. The preliminary index terms of a first type are used as index terms or tokens "as is". Typically, character strings of the first type include roman and katakana type characters, which are utilized as index terms without further processing. In the current embodiment for Japanese shiftJIS characters, character strings of hiragana symbols are ignored.

Preliminary index terms of a second type are step-indexed to create a plurality of index terms having a string length less than or equal to a predetermined step size. In the case of kanji characters, which in the preferred embodiment are the preliminary index terms of the second type, the index is created by taking the collection of symbols forming the kanji character string, and creating a number of index terms each of a length the same as the step size, beginning with the first term in the string, and extending to the end of the kanji string, and thereafter progressively reducing the step size such that the last character in the kanji string is the last index term. In this manner, all kanji terms are taken in "chunks" of the step size or less, always beginning with one of the kanji symbols and always ending with a symbol at the end of a string of four or ending with the last symbol in the string.

The reason for step indexing is to cause the system to treat every kanji symbol or character as the potential beginning of a word. Furthermore, a step size is utilized that is equal to or longer than most words in the language in question. For Japanese, a step size of four is believed to be optimal. The document is then indexed by all tokens produced by the step indexing method. For example, the string "abcdefg" yields the tokens "abcd" "bcde", "cdef", "defg", "efg", "fg", and "g".

At search time, the same rules of token making are used to create search terms from a search query provided by a user, for the most part. For strings of the first type, typically roman or katakana, the entire string is utilized as a search term. A Roman search term must match an index term exactly (unless the user has added pattern matching through the use of "wild card" characters like "?", match any character, or "*", match any number of characters). For Katakana terms, any index term that includes the search term is considered a match, and all object associations (documents) are returned from the index. This is similar to a search in which the "*" wild card character is added to the beginning and end of a search term.

For a kanji string (or any other string of the second type), any index term that begins with the search term string is considered a match, and all object associations are returned. This correlates to a search in which the "*" wild card character is added to the end of the search string. According to one aspect of the invention, if the search term is greater than a pre-defined step size in character length, step token formation is carried out in a manner similar to that described for step indexing. In the current implementation for Japanese Kanji, the step size is 4. The kanji search string is broken into search tokens of a step size of four or less. Each of the search terms produced in this manner has the wild card character "*" added to the end of the search token. Then, all tokens are connected together with an AND Boolean Operator.

In accordance with another aspect of the invention, any documents returned by the index search are then searched sequentially with a direct search to verify that the full search string is matched. This is essentially the same operation that is performed for "phrase searching" in Western language representations. The index search therefore returns potentially matching documents, which are then searched directly to verify any matches.

In the current embodiment for Japanese, it is believed that a step length of four will produce acceptable performance since it is estimated that 95% of kanji search words that a user will enter will contain four or fewer characters. Making a step length shorter saves on the size of the index since index terms are shorter and fewer in number. Although other step lengths can be utilized, for example, three or five, it is believed that poorer performance will occur. When the step length is three, it is believed that the likelihood increases by roughly 20% that a search word will be longer than the step length, forcing a slower direct search of any retrieved documents to verify accuracy. Similarly, it is believed that a step length of five or greater will bring diminishing returns at the expense of a larger index, since the Japanese language does not contain an extraordinarily high number of words that contain five or more kanji symbols.

Token making for other compound-word languages such as Chinese, Hebrew, Arabic, etc. may be constructed in a manner similar to that as described in connection with the Japanese, except of course there is no counterpart to katakana or hiragana symbols. Preferably, step indexing and searching is applied to Chinese character strings in the same manner as for Japanese.

FIG. 1 is an overview block diagram of the process used to generate a search result in accordance with the invention. A query 101 is generated by a program or by a user and sent as input to search system 102. The search system 102 includes a content index 103, a content index search system 104, and a direct search system 105. For the purposes of this invention, the content-index search system 104 is preferably code that searches a content-index 103 based on a query and generates a search result 110.

The direct search system 105 is preferably code that directly searches on an object, such as a document or a file stored in the computer system's memory, based on the query and generates the search result 110, or a portion of the search result. A direct search, as will be known to those skilled in the art, is a search that involves comparison of a search string or token of a given length to each possible string of the given length in the file, starting with the first character in the file and continuing through the file sequentially until each grouping of characters of the given length has been compared to the search string and the last character in the file is encountered.

The search results 110 comprises a list of objects, such as document file names and/or path names in the directory, that identifies objects that satisfy the search criteria.

One skilled in the art will recognize that the direct search system 105 may be an existing system and that the content index search system 104 operates in conjunction therewith. Alternatively, the content-index search system 104 and the direct search system 105 may be part of the same system. Furthermore, the content-index system 104 may operate without the additional search result verification provided by the direct search system. Other variations are also possible.

In particular, the present invention is operative in conjunction and is compatible with the methods and systems described in the patent application entitled "Method and System for Generating Accurate Search Results Using a Content Index", application Ser. No. 08/477,486, filed Jun. 7, 1995, (hereinafter, the "Content Index" patent) the disclosure of which is incorporated herein by reference and made a part hereof, and which is owned by the same assignee as the present invention.

The present invention also provides the ability to conduct a search result when the collection of objects is only partially indexed by the content-index. In such cases, a content-index inclusion rule is provided for determining whether a given object is indexed by the content-index. The portion of the collection of objects indexed by the content-index is referred to as the domain of the content-index. To accommodate partial indexing, the methods and systems used to generate an initial search result are modified to search the remaining portion of the collection of objects not part of the domain in addition to using the content-index, typically by direct searching.

Figure 2:
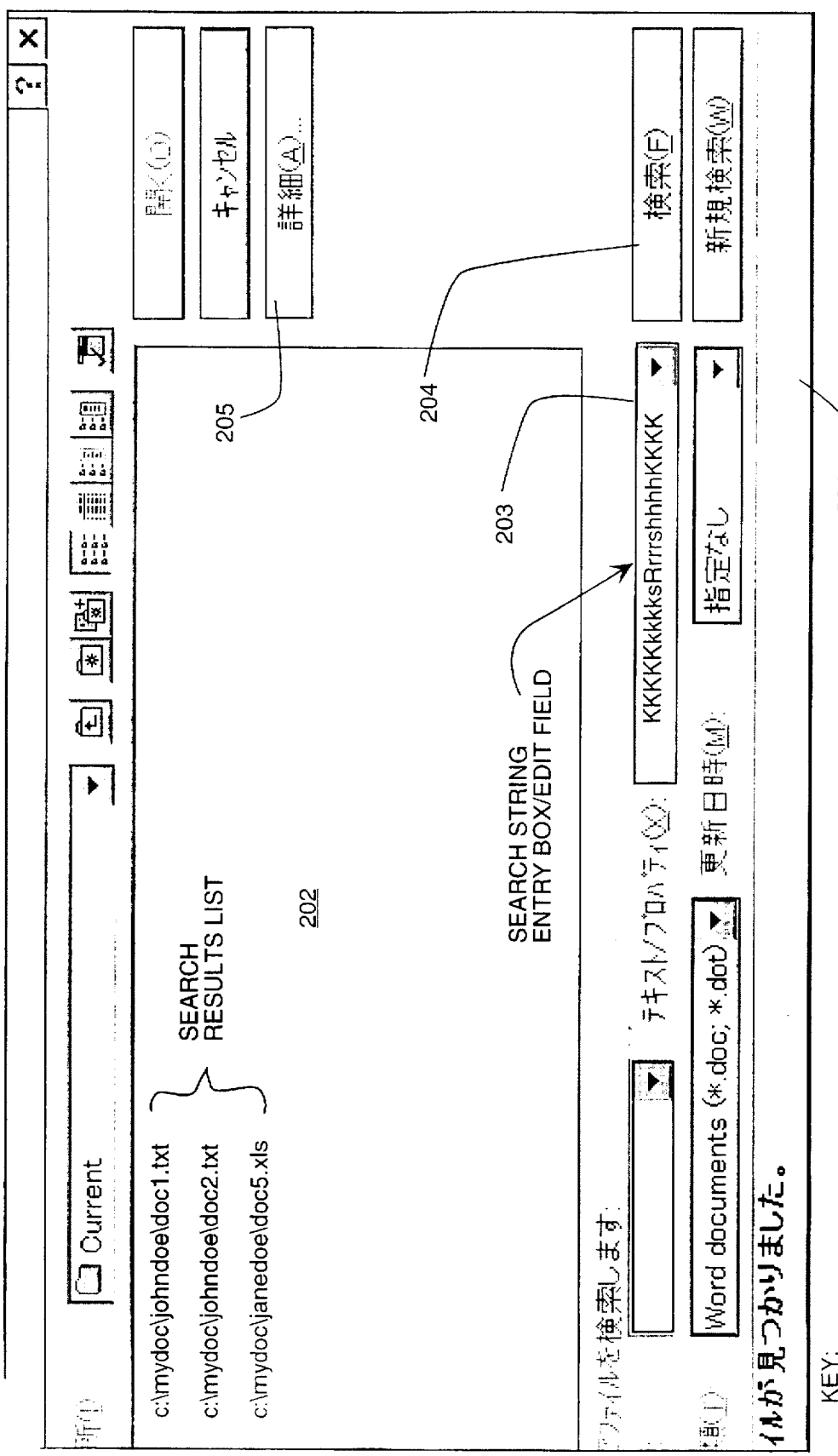
FIG. 2 is an example diagram of a File Open dialog for a Japanese language application program that incorporates the methods and systems of the present invention.

The methods and systems of the present invention can be embodied in a File Open dialog, such as that provided by a word processing application, to open for editing a particular object (e.g. a document or set of documents) that match a specified search criteria. FIG. 2 is an example diagram of a File Open dialog 201 that incorporates the methods and systems of the present invention. The File Open dialog window 201 contains search result list box 202, search string entry box or edit field 203, and various buttons, e.g., the "Find Now" button 204, and an "Advanced Search" button 205 (all in Japanese characters, in this example). These buttons can be depressed in the conventional manner with a user input device, e.g. a mouse pointer and click operation, or cursor keys and return (RET) keys.

When a user wants to find a file with contents that matches a certain search criteria, the user can enter a text string in the search string edit field 203 and press the "Find Now" button 204 to instruct the word processing application to find all of the documents with contents that match the search string specified in edit field 203.

The "Advanced Search" button 205, when depressed, generates an additional dialog (not illustrated), which allows the user to specify a more complex search criteria, for example a phrase search or a proximity search, or certain operators (e.g. Boolean AND, OR, NOT). Specifically, if the user wishes to specify a combination of text strings to search for, then the user uses the Advanced Search dialog to enter the text strings and the way in which the text strings should be combined. For example, the user could specify a search to find all documents containing the word "patent" or the word "application" or both words (sometimes denoted as "patent OR application").

Still referring to FIG. 2, the search string edit field 203 contains an exemplary search string "KKKKKkkkksRrrrshhhhKKK", where K=kanji characters, k=katakana characters, R=uppercase roman characters, r=lowercase roman characters, h=hiragana characters, and s=separator characters. For purposes of the discussion examples, these symbols K, k, R, r, s, h, etc. will be used instead of Japanese characters, it being understood that in the preferred embodiment, such characters are displayed in a Japanese character font, as is shown on the buttons in FIG. 2.

As shown in FIG. 2, the search result list box 202 currently contains the names of the files that contain the text string specified as the search string edit field 203 after the user has pressed the "Find Now" button 204. Specifically, the search result list box 202 contains the names of three files, "c:\mydoc\johndoe\doc1.txt," "c:\mydoc\johndoe\doc2.txt," and "c:\mydoc\janedoe\doc5.xls," which contain the string (or a portion thereof) shown in edit field 203. The search result that is displayed in the search result list box 202 is generated using the methods and systems of the present invention. Typically, the result of the search is generated using a content-index that indexes the files of the file system.

Although the present invention is discussed specifically with reference to documents as objects, one skilled in the art will appreciate that the present invention is useful in other contexts as well, such as with any object that may be indexed for searching purposes. For example, a graphical object, such as an electrical drawing, that contains symbolic information, such as bitmaps of transistors and NAND gates, can be indexed in a content-index using graphical bitmaps. A content-index search system for these graphical objects determines matches by searching the object contents for the presence of the indexed graphical bitmap, for example, by searching for a pattern of bits. In a similar manner, any content-index that indexes a collection of objects is subject to the methods and systems of the present invention as long as a content-index search system is implemented.

Figure 3:
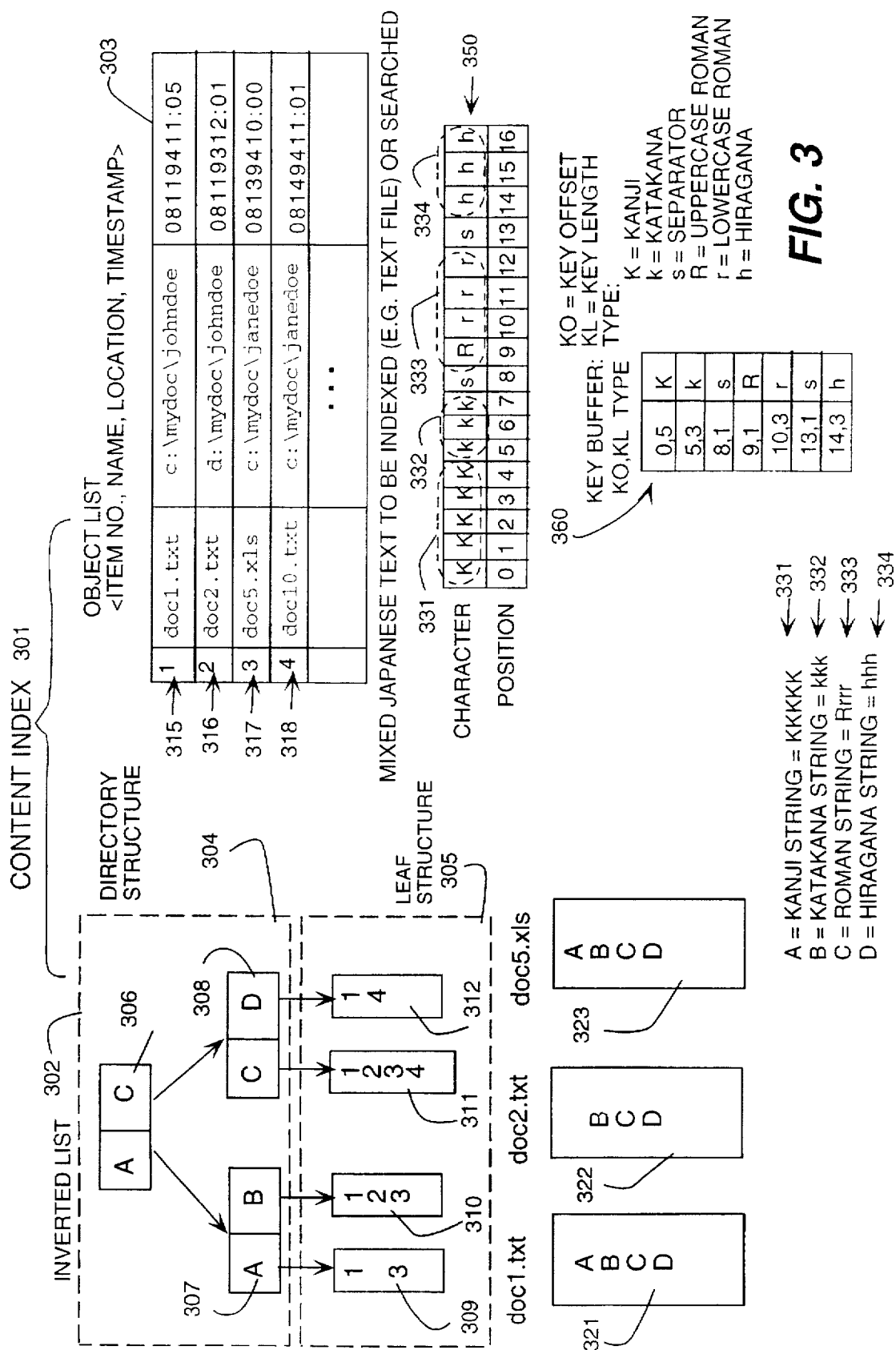
FIG. 3 illustrates a typical implementation of a content-index for a collection of documents, an example of a mixed-symbol Japanese text string to be indexed or searched, and a key buffer used to facilitate indexing and searching.

FIG. 3 illustrates a typical implementation of a content-index for a collection of documents. The documents shown in FIG. 3 are those discussed with reference to FIG. 2. The content-index 301 is shown after it has been generated to index the "doc1.txt" document 321, the "doc2.txt" document 322, and the "doc5.xls" document 323. The content-index 301 comprises an inverted list 302 and an object list 303. The inverted list 302 is arranged such that it efficiently stores the indexing terms and the references to the documents that contain each term. In a typical implementation such as that shown in FIG. 3, the inverted list 302 comprises a directory structure 304, which contains the indexing terms, and a leaf structure 305. The leaf structure 305 contains leaves 309–312, which contain the references to the indexed documents. The directory structure 304 stores the indexing terms (or other indexing information) in a data structure that allows efficient location of the desired term. For example, directory structure 304 is shown implemented as a binary tree (B-tree), which contains three nodes: node 306, node 307, and node 308. The letters "A," "B," "C," and "D" represent the indexing terms, and correspond to exemplary kanji string KKKKK 331, an exemplary katakana string kkk 332, an exemplary roman string Rrrr 333 (with initial uppercase letter), and a hiragana string hhh 334, respectively. The leaf structures 309–312 each contain references to the documents that contain the indicated indexing term.

Consider, for example, document 321 and document 323, which both contain the term "A." Node 307 in the directory structure 304 contains an entry for the indexing term "A." This entry points to leaf structure 309, which contains references to two documents labeled "1" and "3." In the particular implementation shown, the leaf structures 309–312 point to a centralized list of documents for the entire content-index (object list 303) to avoid storing large or redundant amounts of information in the leaf structures themselves. Thus, the references to a document "1" and a document "3" in the leaf structure 309 indicate which documents in the object list 303 contain the indexing term. Specifically, leaf structure 309 indicates that the document referred to by the first entry 315 in object list 303 contains indexing term "A" and that the document referred to by the third entry 317 in object list 303 also contains the indexing term "A." The object list 303 also contains additional information regarding each object (document) that is indexed by the inverted list 302. As shown, object list 303 contains in each entry the name of the object, the location of the object (a directory path), and a timestamp indicating the last time the object was modified. By examining the referred to entries in object list 303, the names and locations of the documents containing the indexing term "A" can be retrieved. Thus, the first entry 315 refers to the document "doc1.txt" 321 and the third entry 317 refers to the document "doc5.xls," both of which contain the term "A."

A content-index such as that discussed in conjunction with FIG. 3 is used to generate the contents of the search result list box 202 of the File Open dialog 201 in FIG. 2. When the user presses the "Find Now" button 204, the code that implements the File Open dialog invokes a search system which uses one or more content indexes if these are available. Each content index uses the directory structure 304 of the inverted list 302 to find the node(s) that correspond(s) to the one or more search criteria (search terms) specified in edit field 203. When a term is located in the directory structure 304, the leaf structure associated with the corresponding node is examined to retrieve the references to the documents that contain that indexing term. With respect to the example of FIG.2, the content-index search system uses the content-index to find all of the documents that contain the term "C" (e.g. the Roman string RRRR in a shift-JIS representation) and the term "D" (i.e., a hiragana string hhh in a shiftJIS representation). As seen in the inverted list 302, the documents referred to by references "1" and "4" match this search criteria, and the documents "doc1.txt" 321 and "doc10.txt" are referred to by to entries 1 and 4 in the object list 303. Once the document references have been retrieved, the content-index search system generates fully qualified names (pathnames) of the documents by examining the proper entries from object list 303 and then stores the pathnames as an initial search result. The initial search result contains the name "c:\mydoc\johndoe\doc1.txt" and "c:\mydoc\janedoe\doc10.txt".

Note, however, that this initial search result is incorrect as seen by examining the illustrated contents of documents 321, 322, and 323. Specifically, assume that the document "doc10.txt" is no longer part of the collection. Also, assume that the documents "doc2.txt" 322 and "doc5.xls" 323 have been modified since the content-index 301 was last updated and now match the search criteria because they both contain the terms "C" and "D."

Search result correction routines may be invoked to correct the initial search result. Specifically, such search result correction routines can determine that the document "c:\mydoc\janedoe\doc10.txt" is no longer part of the collection and remove the reference to this document from the initial search result. In addition, search result correction routines can determine that documents 322 and 323 have been modified since the time indicated by the timestamp contained in the content index entries 316 and 317, which correspond to these documents. Each of these modified documents is then directly examined (a direct search) to determine whether it matches the search criteria. After determining that documents 322 and 323 now match the search criteria, the search result correction routines add references to the documents "c:\mydoc\johndoe\doc2.txt" and "c:\mdoc\janedoe\doc5.xls" to the initial search result. The code that implements the File Open dialog then displays the corrected search result in search result list box 202.

One skilled in the art will recognize that the search result displayed in list box 202 can be incrementally generated and the incremental changes can be displayed as they are determined. Alternatively, all of the corrections to the initial search result can be determined before updating the displayed list. Other similar variations are also possible in conjunction with the methods and systems of the present invention.

Still referring to FIG. 3, and as will be discussed in greater detail below, the preferred embodiment of the invention utilizes a key buffer 360 to temporarily store information from a text buffer or file as the index terms or search terms are formed from a string of mixed text. The key buffer 360 holds tuples that reference keys (substrings) within the main text buffer. Each tuple preferably contains (1) a pointer to the key within the main text buffer, (2) the key's length in bytes, (3) character type, e.g., kanji, katakana, etc. In addition, the tuple may contain additional type information (e.g. date, number, text, Boolean) or other information relating to the document being processed.

For example, the exemplary Japanese text string 350 KKKKKkkksRrrrshhh represents a mixture of word characters of type kanji, katakana, Roman and hiragana. The string also includes a non-word character indicated by an "s" in this example. This character could be a space, a comma or any of a number of word separators used in Western languages. This character might also be a Japanese middle-dot character or any other Japanese character that is not found within words. Characters in this non-word "other" category are simply ignored.

This string in this example could either be text in the text buffer to be indexed, or text entered by a user in the search string entry box 203 in FIG. 2 for use in forming search tokens. Note that each character or symbol in the string 350 has a predetermined position ranging from 0 to 16. Each of these characters has a type and a position; a sequence of characters of the same type has a string length. As such, a substring can be represented in the key buffer 360 by a key offset parameter (KO), a key length parameter (KL), and a type, where K=kanji, k=katakana, s=separator, R=uppercase roman, r=lowercase roman, and h=hiragana. For example, the five character kanji string 331 begins at location 0 and extends for five characters, as represented by the tuple (KO, KL)=(0, 5) of type K. In like manner, each of the substrings can be represented by the tuples indicated in the key buffer 360. As described below, data in a text buffer or in the search string entry box is processed into the key buffer prior to further processing to form preliminary index terms, index terms, or search terms.

In preferred embodiments, the methods and systems of the present invention are implemented on a computer system comprising a central processing unit, a display, a memory, and input/output devices. Preferred embodiments are designed to operate in an operating system environment such as the Microsoft WINDOWS environment defined by Microsoft Corporation in Redmond, Washington. One skilled in the art will recognize that embodiments of the present invention can be practiced in other operating system environments.

Figure 4:
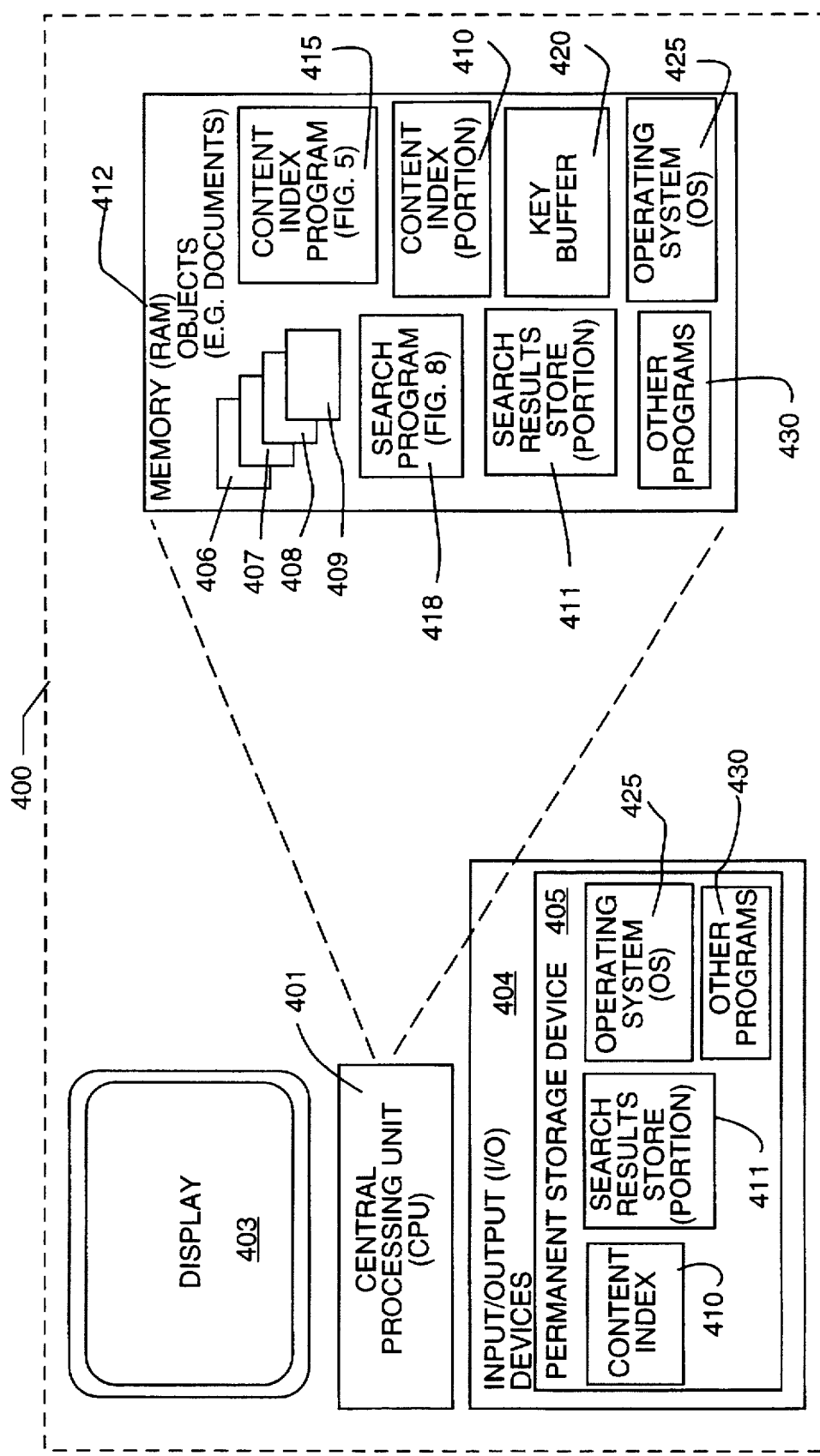
FIG. 4 is a block diagram of a general purpose computer for practicing preferred embodiments of the present invention.

In this regard, FIG. 4 is a block diagram of a general purpose computer 400 for practicing preferred embodiments of the present invention. The computer system 400 contains a central processing unit (CPU) 401, a display screen (display) 403, one or more input/output devices 404, and a computer memory, comprising a permanent storage device 405 such as a hard disk drive, and a random access memory 412. By use of the term "memory", we mean a permanent storage device 405, random access memory (RAM) 412, or both, in whole or in part. The memory stores various computer programs, typically resident in "permanent" form on the permanent storage device, but portions of which may be resident in RAM for execution by the CPU 401.

In accordance with the invention, there is provided a content index 410, a search results store 411, a content index program 415, a search program 418, a key buffer 420, a computer operating system 425, and perhaps other programs 430.

It will be understood that the search program 418, the index program 415, and the code used to store the content-index and the search results preferably reside in the memory and execute on at least one CPU such as the CPU 401. These programs are shown residing in RAM 412 as well as in the permanent storage device 404, along with other programs 430. A content-index, such as that described with reference to FIG. 3, is shown as content-index 410 also residing in the memory. A search result, when generated in response to a query, is shown also in the memory as search results store 411.

The memory is also shown containing the objects 406, 407, 408, and 409, which are indexed by the content-index 410. Alternatively, these objects and various parts of the context index 410 or search results store 411 may reside on an input/output device 404 such as permanent storage device 405.

Although the computer system 400 is shown as a single computer, one skilled in the art will appreciate that the present invention may be practiced on processing systems with varying architectures, including networked environments, multiprocessor environments, and on systems with hardwired logic.

In one aspect of the invention, a preferred embodiment provides an index system and an index search system (program or code module) for carrying out the methods of the present invention.

Figure 5:
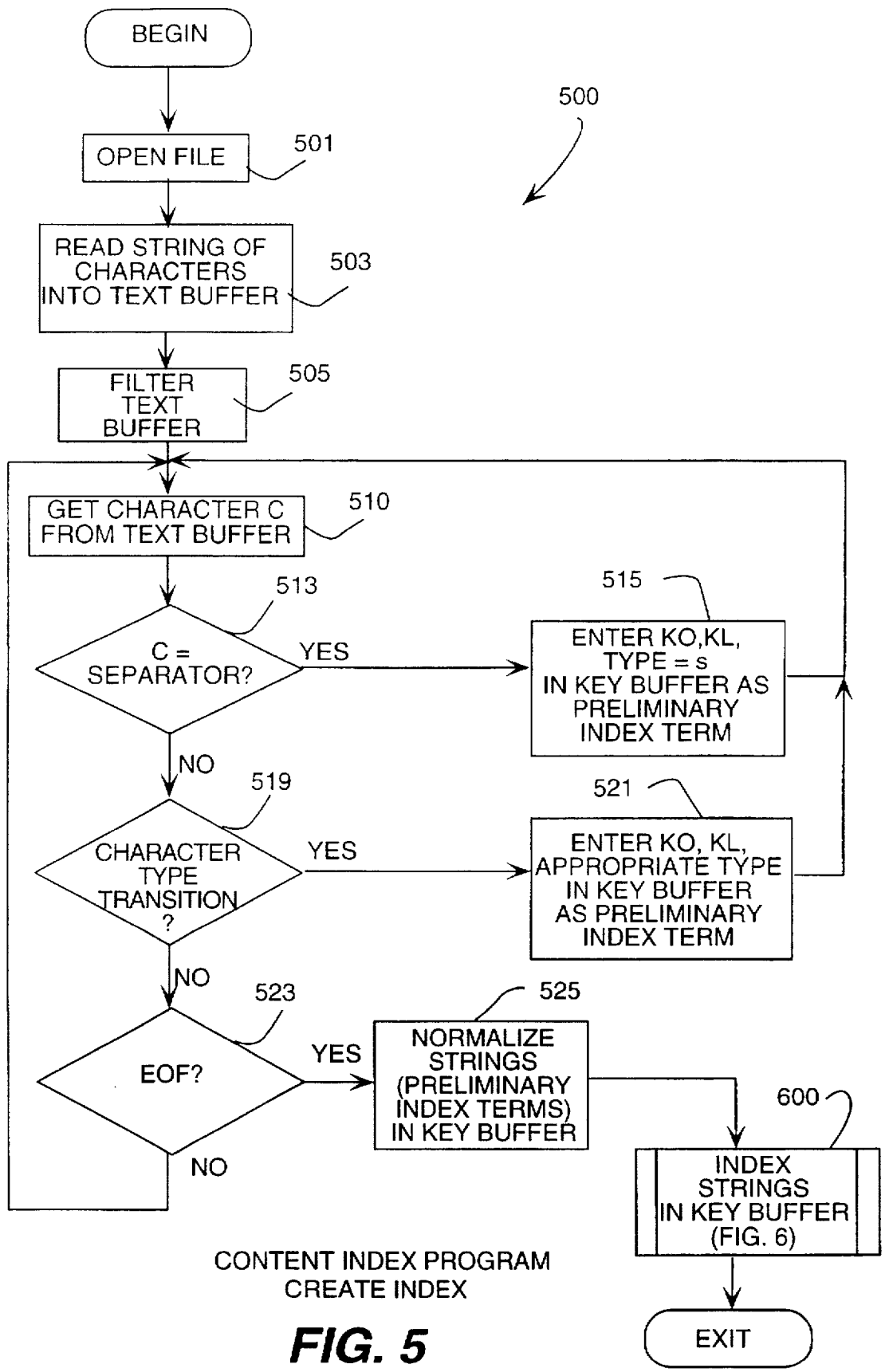
FIG. 5 is a flow diagram of the computer program code or routine for creating a content-index in accordance with the present invention.

FIG. 5 is an overview flow diagram of the create content-index search code 500 according to the present invention. The create-index code takes a file of text in a compound-word language such as Japanese or Chinese, filters the text, and then "breaks" the resulting string into a plurality of preliminary index terms. Preliminary index terms are each a longest substring that contains only word characters and only characters of a single type (Kanji, Katakana, Hiragana or Roman). After creating the preliminary index terms, which are stored in the key buffer, the preliminary index terms are further processed to index the string and create the content-index by associating the object with each of its index terms.

Specifically, at step 501 an object such as file or document is opened or otherwise identified to the code module to specify the object that is to be indexed. Contents of the object first filtered at step 505 to eliminate pictures, graphics, formatting and other non-textual information. The resulting text is fed, at step 503, into a text buffer, which is a section of memory allocated for temporarily storing all or at least a portion of the data to be indexed.

At step 510, steps are begun to create the preliminary index terms. First, a given character C in the text buffer is retrieved and examined. At step 513, if the character C is a separator, the key offset (KO) and key length (KL) and type=s (separator) are entered into the key buffer at step 515.

If at step 513 the character is not a separator, the "no" branch is taken to step 519. If the character C represents a character type transition, for example from kanji to katakana, the "yes" branch is taken to step 521. At step 521, the values of KO, KL and type are entered into the key buffer as delimiting a preliminary index term.

As described elsewhere, character types for Japanese in shift-JIS are kanji, hiragana, katakana, and roman (ASCII). Substrings, that is, preliminary index terms, are formed at character transitions because characters of different types can never be in the same word, with a small number of exceptions for characters shared in common by hiragana and katakana. The output of the simple word breaking stage, set forth in inquiry boxes 513, 519, are strings, which are candidates for preliminary index terms, in which all characters are of the same type, e.g., all kanji, all roman, all katakana, or all hiragana.

If at step 519 there is no character type transition yet, the "no" branch is taken to step 523, where the inquiry is made whether the end of file (EOF) has been encountered. If not, the "no" branch is taken back to step 510 and the next character is examined. The above-described steps repeat until encountering the end of all the text in the text buffer. When the EOF marker is seen at step 523, the "yes" branch is taken to step 525.

At step 525, the strings in the key buffer (that is, the preliminary index terms) are normalized. The process of normalization entails adding or replacing predetermined characters of the character string forming the preliminary index terms in the key buffer. It is known that sometimes two characters or character combinations are used interchangeably in certain languages use of one combination or other does not affect the meaning much, if at all. For example, variations between upper and lower case in roman (English) do not usually affect meaning for purposes of indexing. In Japanese shift-JIS coding, certain katakana and ASCII characters can be represented using either a single or double-byte character code. Regardless of code, characters appear much the same to a user and codes are often used interchangeably. In accordance with the invention, all katakana and roman strings are normalized to a single byte representation. Normalization eliminates a certain "noise" factor by changing any double-byte representations to a single-byte representation. Those skilled in the art will understand which characters in the shift-JIS representation may be normalized in this manner.

After normalizing the strings in the key buffer at step 525, the routine for indexing strings in the key buffer is carried out at step 600.

One skilled in the art will recognize that the content index program 500 for creating the preliminary index terms need not necessarily be executed in the order shown in FIG. 5. More specifically, in embodiments that support parallel processing or threaded processes, the routines may be to some extent executed in parallel or as separate threads. For example, a file can be split into a number of different text buffers and processed independently, since there is no requirement that a file being indexed be handled in any particular sequential manner. Also, certain of the routines could be executed in reverse order. Different variations are possible depending upon the optimizations desired, which will occur to those skilled in the art.

Figure 6:
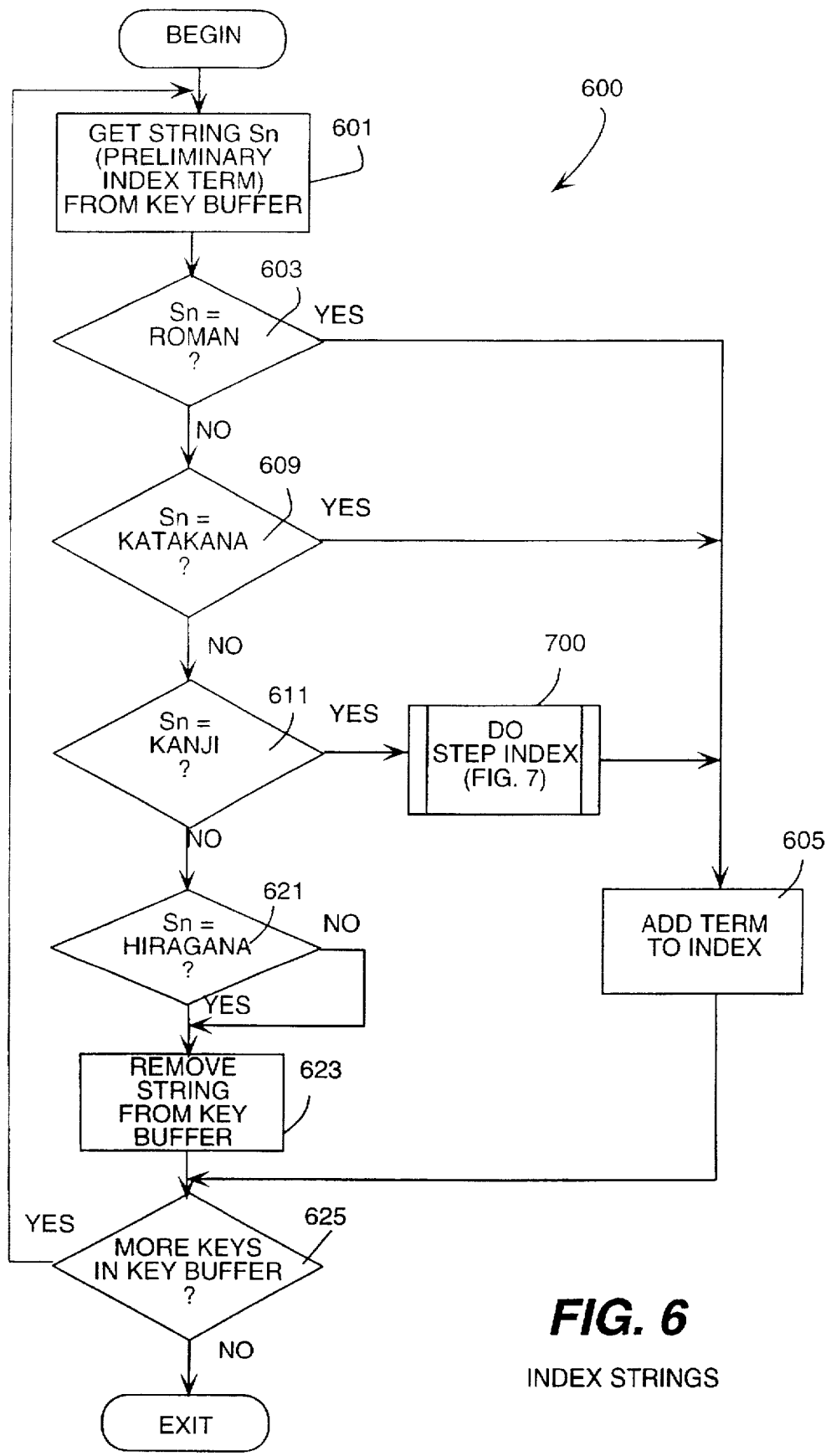
FIG. 6 is a flow diagram of a routine for indexing strings.

FIG. 6 is a flow diagram of the index strings code 600, which corresponds to the step 600 in FIG. 5. This routine processes the data in the key buffer, that is, the preliminary index terms, and creates index terms for certain character types and carries out step indexing, as will be described, for other character types, more specifically kanji.

Starting at step 601, the first step taken is to get a string Sn, that is, a preliminary index term, from the key buffer. At step 603, if the string Sn is of a roman type, the "yes" branch is taken to step 605, and the entire string, whose position is indicated by the value of the parameter KO in the key buffer and of length KL, is utilized as a final index term. Then, the index term so formed is added to the index in the conventional manner. Those skilled in the art will understand that the process of adding a term to a sorted index constructed in a binary tree comprises traversing the tree to locate the position in the B-tree for the index term and creating an association between that index term and the object for file being processed.

Figure 7:
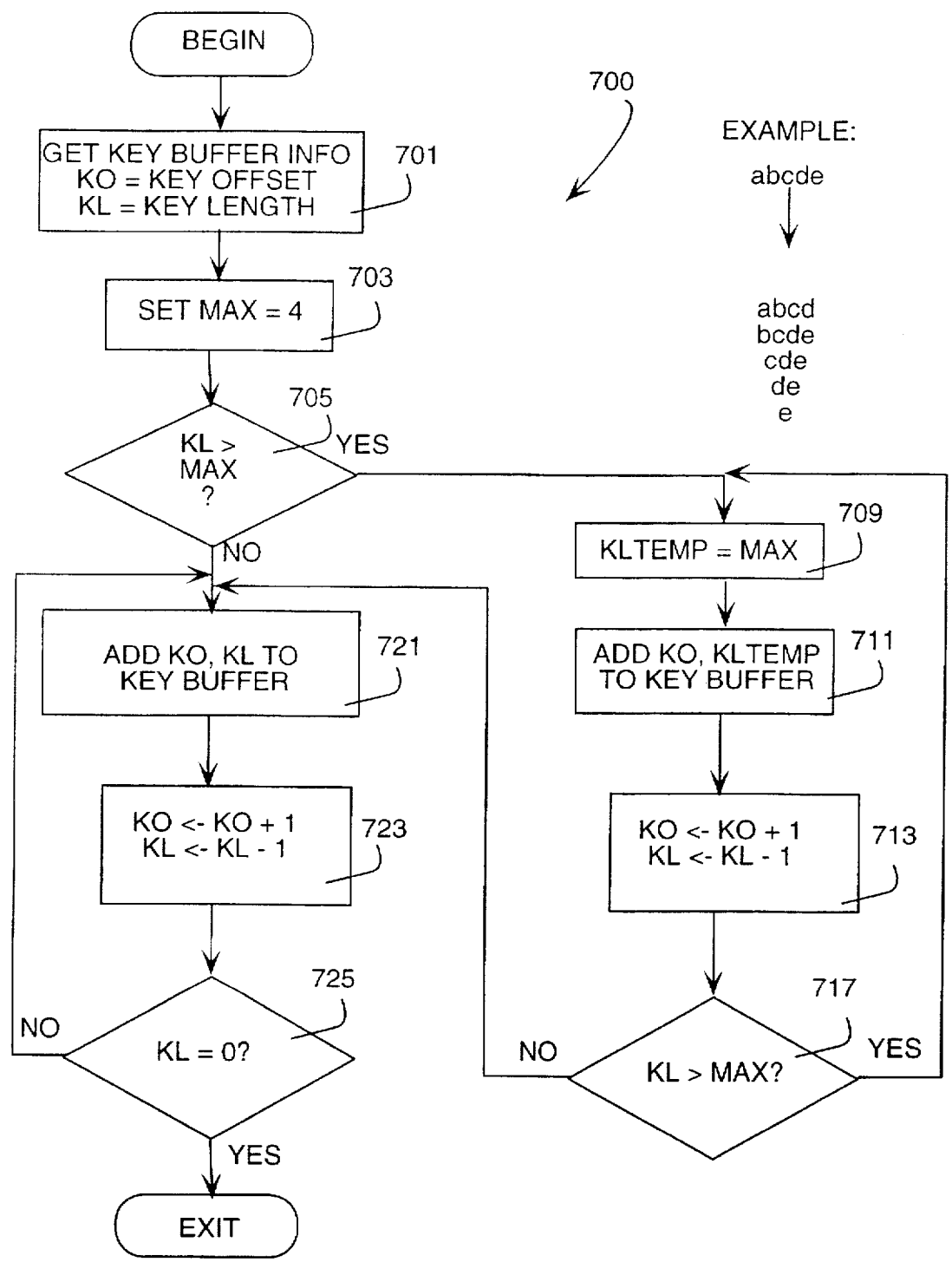
FIG. 7 is a flow diagram of a routine for step indexing.

If at step 603 the string Sn is not roman, the "no" branch is taken to step 609, where the string Sn is examined to see if it is of the type katakana. If so, the "yes" branch is taken to step 605. If at step 609 the preliminary index term Sn is not katakana, the "no" branch is taken to step 611, where the inquiry is made whether the character type is kanji. If so, the "yes" branch is taken to step 700, where a step index routine, described in connection with FIG. 7, is executed. After returning from the step index routine at step 700, the code branches to step 605 and the index term is added to the index.

After step 611 if the character type is not kanji, the "no" branch is taken to step 621, where the inquiry is made whether the string Sn is of type hiragana. If so, the "yes" branch is taken to step 623, and the hiragana string is deleted from the key buffer. In the current embodiment, hiragana strings are ignored (that is, they are not added to the index), since hiragana is typically used only to write verb inflections and preposition-type word such as "to" and "of". However, some words (common words or sometimes in children's books) are also written in Hiragana. A preferred implementation for Japanese would include a Japanese stop word list. All Hiragana terms not on this list would be indexed as type 1 terms, just as for Katakana and Roman.

From step 623, the code branches to step 625, where the inquiry is made whether there are any more keys in the key buffer to be processed. If so, the "yes" branch is taken back to step 601 to process the next string Sn. If the key buffer has been completely examined, the "no" branch is taken and the index strings code routine exits.

The process described in FIG. 6 is also followed in order to search one or more documents directly neither as a follow-on to an index search or when documents must be searched that are not included in an index. For direct searching, however, there is no step indexing (step 700) nor are terms added to the index (step 605).

Turning next to FIG. 7, the steps taken in the code for step indexing, shown at step 700 in FIG. 6, will next be described. The step index code 700 is utilized to create tokens of length AX, which represents a maximum step size. For Japanese represented in shift-JIS, in the preferred embodiment the step size is preferably four or smaller. In particular, the code shown in FIG. 7 takes a string such as "abcdefg" and yields the substrings or tokens "abcd", "bcde" "cdef", "defg", "efg", "fg", and "g". The idea for step indexing is to treat every kanji character in a substring or preliminary index term as the potential beginning of a word, since one cannot be certain where words begin in a kanji string. Furthermore, the step size should be that equal to or longer than most words encountered in the language of interest. All tokens produced by step indexing form index terms.

Starting at step 701, the key buffer entry for the kanji string being processed is read from the key buffer to obtain the tuple (KO, KL). At step 703, the value of a temporary variable MAX is set to four. The variable MAX represents the step size, which of course can be varied for other languages. However, it is believed that for Japanese encoded in shift-JIS the optimal step size is four.

At step 705, the key length parameter KL for the kanji string is compared to MAX. Assume for purposes of this discussion that the preliminary index term consists of five kanji characters KKKKK, which we will represent as "abcde". If KL is greater than MAX, the "yes" branch is taken to step 709, where a temporary variable KLTemp is set to the value of MAX. At step 711, the value of KO, KLTemp is added to the key buffer. This adds the kanji string abcd to the key buffer for use as an ultimate index term.

At step 713, KO is replaced by KO+1, and KL is replaced by KL−1. In other words, a pointer moves to the next sequential location in the kanji string and the length of the string is decremented by one to indicate that a first token has been formed. Then, at step 717, the value of KL is compared to MAX. If KL is greater than MAX, the "yes" branch is taken back to step 709 and the steps 709, 711, and 713 are repeated. In this manner, the exemplary string "bcde" is added to the key buffer. These steps would continue for strings longer than the exemplary string, of course.

At step 717, when KL is no longer greater than MAX, the "no" branch is taken to step 721. When this branch is taken, the length of the remaining characters in the preliminary index term is less than MAX, indicating that the final character in the string now forms the last character in a substring of size MAX in the previous operation. Then, at step 721 the present value of KO, KL is added to the key buffer. In the example being discussed, the substring "cde" is added as an index term or token to the key buffer.

At step 723, KO is replaced by KO+1, and KL is replaced by KL−1. At step 725, the value of KL is examined to see if zero has been reached. If not, the "no" branch is taken to step 721, and successively smaller tokens are created as index terms, each ending in the final kanji character of the preliminary index term. The steps are repeated until only the final kanji character in the preliminary index term has been added as a separate token to the key buffer. After KL reaches zero, the step indexing routine is complete, the "yes" branch is taken from step 725 and the routine exits.

The preceding routines have been directed toward procedures for creating index terms that associate an object such as a document or file with an index term. As those skilled in the art will understand, in order to conduct an efficient search, a user provides as a query one or more search terms that are utilized as keys to access the content-index and retrieve a list of references to all objects that contain the particular index term. A similar procedure to that described above in connection with the creation of index terms is carried out in order to create search terms from a user-specified search string (such as that of 203).

Figure 8:
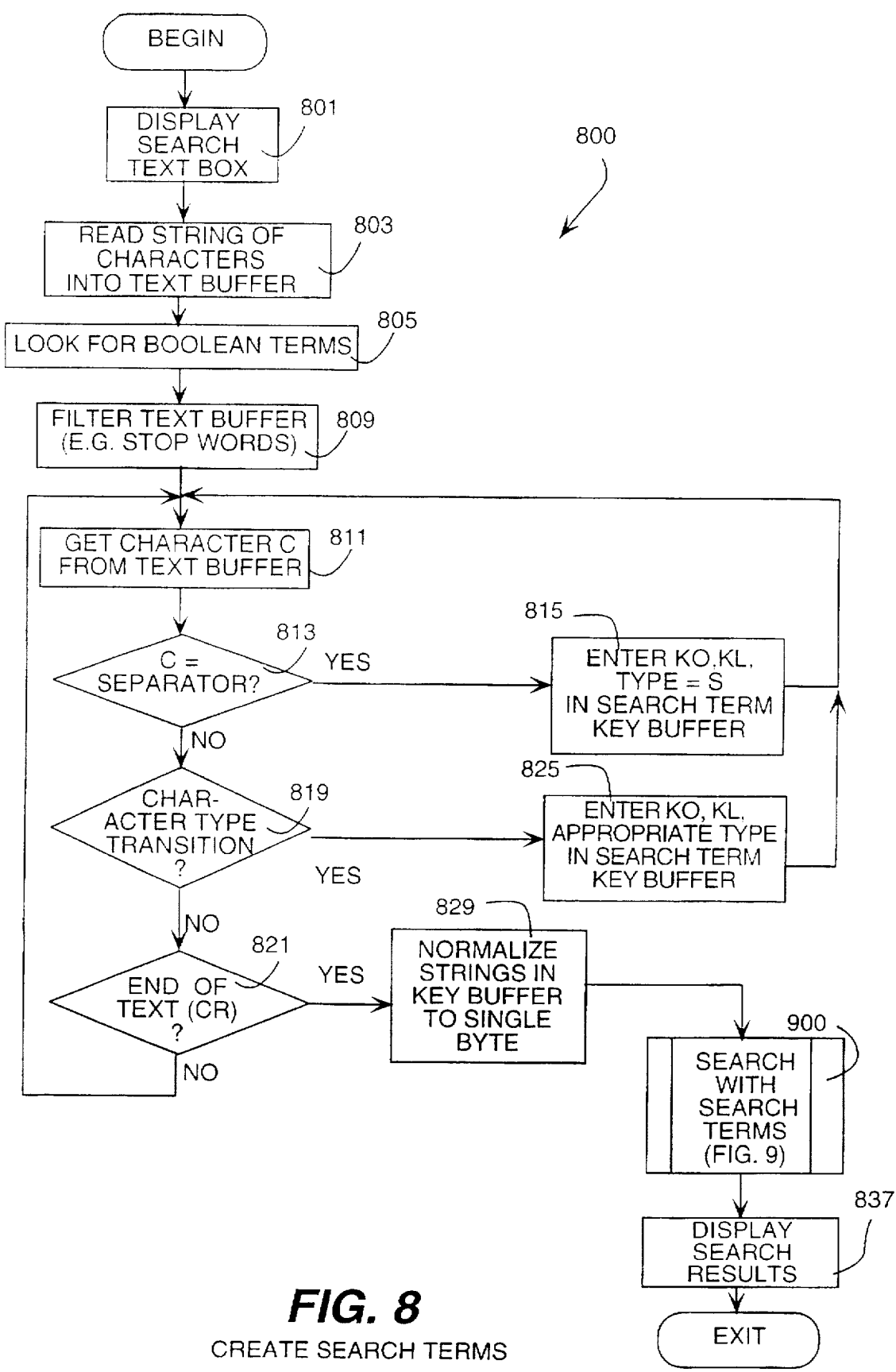
FIG. 8 is a flow diagram of a routine for creating search terms and displaying search results.

Turning next to FIG. 8 in this regard, a routine 800 for creating search terms will be described. The routine in FIG. 8 is operative to receive a search string or query entered into the search string entry box 203 shown in FIG. 2, derive preliminary search terms, derive search terms from preliminary search terms, and provide the search terms to a search engine that retrieves references to objects containing the search terms.

The first step taken at step 801 is to display the dialog such as the File Open dialog 201 shown in FIG. 2. This creates the edit field 203 into which the user can type a search string utilizing an input device such as a keyboard associated with a computer system that effects the present invention.

At step 803, a string of characters that is entered into the search string entry box 203 is read into a text buffer. At step 805, the search string is examined for the existence of any Boolean terms or other separators. The presence of any terms such as AND, OR, NOT, or other punctuation terms are treated as Boolean operators. For example, a comma is treated as a logical OR operator, while any separator other than a comma is treated as a logical AND operator. These Boolean terms are utilized in the query tree. Those skilled in the art will understand that after the search terms are created, they are utilized together with any Boolean operators to construct a query tree that is used to select which objects satisfy the search criteria, in the known manner. Since the operation of a search engine that utilizes a query tree for searching with indexes is known in the art, it will not be discussed further herein.

In step 809, the text buffer containing the search string is filtered to remove any "stop" or "noise" words. These words include prepositions, definite and indefinite articles, etc., and is typically language specific. After removing the stop words, the search string is now ready to be processed to identify separators and character type transitions, somewhat similar to that described in connection with FIG. 5, thereby deriving preliminary search terms.

At step 811, the first character C in the text buffer is examined. If at step 813 the character C is a separator, the "yes" branch is taken, and the value of (KO, KL) and type=s is entered into a search term key buffer at step 815, and the flow returns to step 811. If at step 813, the character is not a separator, the "no" branch is taken to step 819 and the inquiry is made whether there is a character type transition. If not, the "no" branch is taken to step 821, and the inquiry is made whether the end of the text in the search string entry box has been encountered, which is typically the presence of a carriage return (CR) or other delimiter. If not, the "no" branch is taken back to step 811.

At step 819, if a character type transition has been encountered, the "yes" branch is taken to step 825 and the tuple (KO, KL) and appropriate type indicator is entered into the search term key buffer. The flow then returns to step 811. In this manner, a string of characters of the same type is marked with the key offset and key length parameters as described in connection with FIG. 5.

Returning to step 821, if the end of text has been encountered, the "yes" branch is taken to step 829, where all search terms in the key buffer are normalized in the manner described above. As described above, normalization include operations that change, add or delete characters, such as various katakana "sounds same" transformations, two-byte to single-byte normalization for katakana and ASCII characters, case normalization to transform any upper case characters to lower case, etc.

After normalizing at step 829, the search is conducted utilizing the search terms at step 900, as described in connection with FIG. 9. After the search is completed and the list of objects that satisfy the search criteria are returned, they are displayed as the search results list at step 837, and the routine exits.

Figure 9:
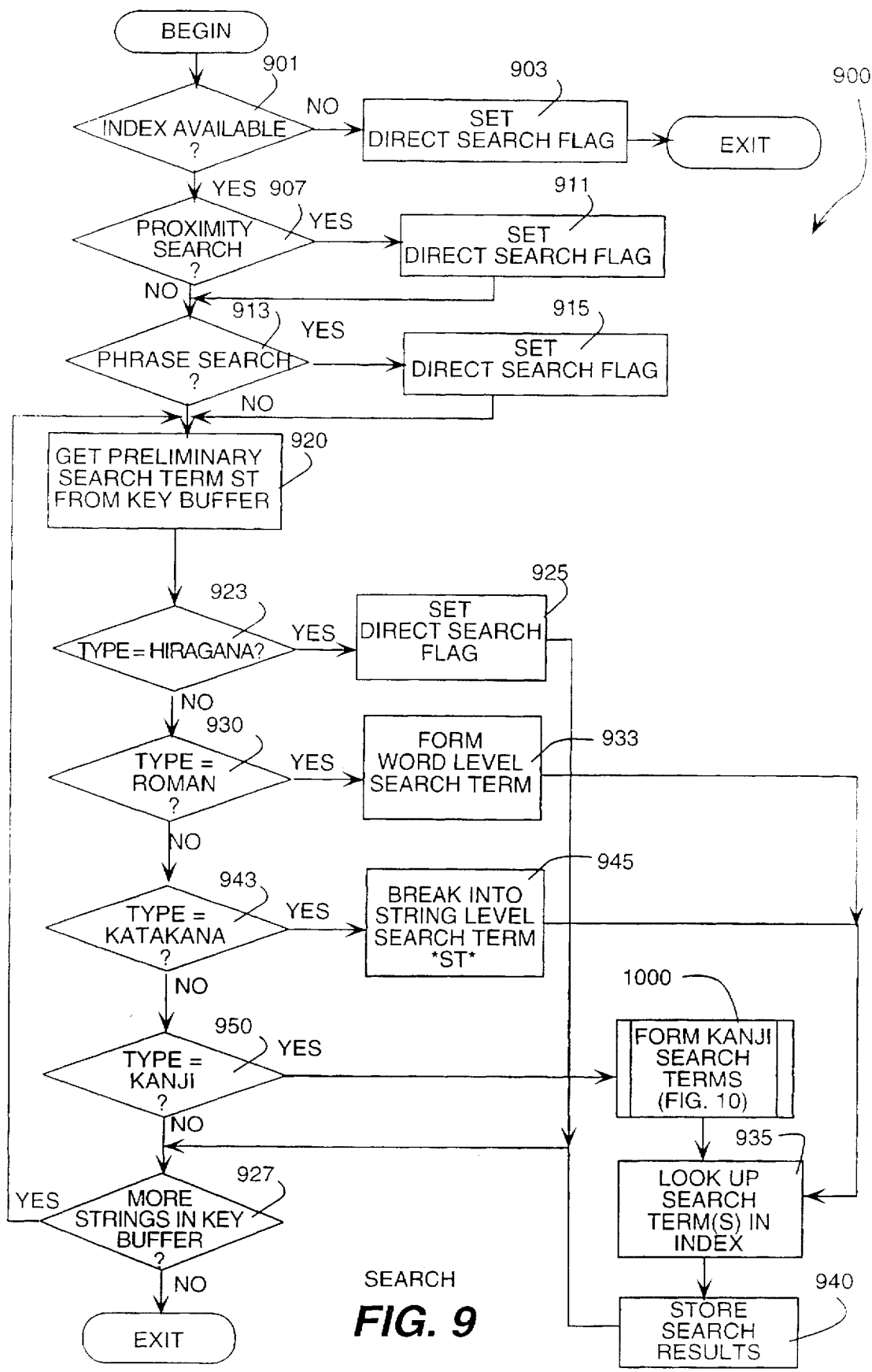
FIG. 9 is a flow diagram of a routine for conducting a search.

FIG. 9 is a flow diagram of the search routine that corresponds to the routine 900 shown in FIG. 8. In this routine, the preliminary search terms in the key buffer are, in certain cases, utilized directly as search terms, and in other cases processed further to form search terms.

Prior to describing the search code steps, it should be understood that the search being described is primarily that of utilizing a content-index as described herein. However, in certain cases, a direct search is utilized in the preferred embodiment. By "direct search", we mean a search of an object such as a file or document by comparing a search term or character string of a predetermined length with each possible character string of that given string length, taken sequentially in the object or document beginning at the beginning of the file and extending to the end of the file, until all the contents of the file have been compared to the key. As will be understood by those skilled in the art, such direct searches are slow compared to an index search, but certain types of search operations cannot be conducted with an index search.

Starting at step 901, the inquiry is first made whether an index is available for utilization. If not, the "no" branch is taken to step 903, and a direct search flag is set to indicate that a direct search should be conducted. Typically, a direct search will be conducted within a designated directory or subdirectories.

If an index is available, the "yes" branch is taken from step 901 to step 907. At step 907, the inquiry is made whether user has entered a command to conduct a proximity search. A "proximity search" is a search to determine whether a given first search term or key is within a predetermined number of characters from a second search term or key. If a proximity search is indicated, the "yes" branch is taken to step 911 where the direct search flag is set, and the program flow passes to step 913.

At step 913, the inquiry is made whether a phrase search has been indicated by the user. A "phrase search" is a search of a plurality of terms that appear in sequence (no intervening terms). Any documents that are identified as containing the search terms by searching in the index are then further searched directly to identify those documents containing the desired phrase. If a phrase search is indicated, the "yes" branch is taken to step 915, and the direct search flag is set. Then program flow passes to step 920.

Starting at step 920, a loop is entered where the preliminary search terms from the key buffer are examined to determine if they may be utilized directly as search terms, or whether further processing is desired, as in the case of kanji, or whether direct searching should be indicated. At step 920 a preliminary search term ST is retrieved from the key buffer. At step 923, the type of the entry from the key buffer is examined. If the type is hiragana, the "yes" branch is taken to step 925, and the direct search flag is set. The program flow then branches to examine other strings in the key buffer at step 927. If there are more strings in the key buffer at step 925, the "yes" branch is taken back to step 920 and the next item in the key buffer is examined.

If at step 923 the type is not hiragana, the "no" branch is taken to step 930 and the inquiry made whether the type is roman. If the type is roman at step 930, the "yes" branch is taken to step 933 and the string is used as a word level search term. Program flow then passes to step 935, where the search term is utilized to access the content-index and retrieve a list of objects that contain this particular search term. After retrieving the list of objects, they are stored in a temporary buffer at step 940, and program flow passes to step 927.

If at step 930 the type is not roman, the "no" branch is taken to step 943, and the inquiry is made whether the type is katakana. If so, the "yes"0 branch is taken to step 945 and the katakana string is formed into a string level search term. It should be understood at this juncture that for a katakana string, the entire index term list is searched. Any index term that includes the katakana string is considered a match, and all of its document associations are returned from the index. This is similar to a search in which the "*" wild card is added to the beginning and the end of the search string. Searching the entire index term list in this manner takes longer than a typical search of the index in which only exact matches are returned. However, the search for a katakana string within the index is still believed to be faster by an estimated order of ten or more than searching all objects in the collection directly.

The string level search term, *ST*, is then utilized at step 935 at described, and the search results are stored at step 940.

If at step 943 the type is not katakana, the "no" branch is taken to step 950, and the inquiry is made as to whether the type is kanji. If not, the "no" branch is taken to step 927. If so, the "yes" branch is taken to step 1000, and kanji search terms are formed in accordance with the procedure described in connection with FIG. 10. After forming the kanji search terms by the routine 1000, program control passes to steps 935 and 940 as previously described.

The result of the steps described in connection with FIG. 9 is the storage of search results, that is, a list of objects that satisfy the search criteria, stored in a temporary buffer, so that they can be displayed or otherwise utilized.

Figure 10:
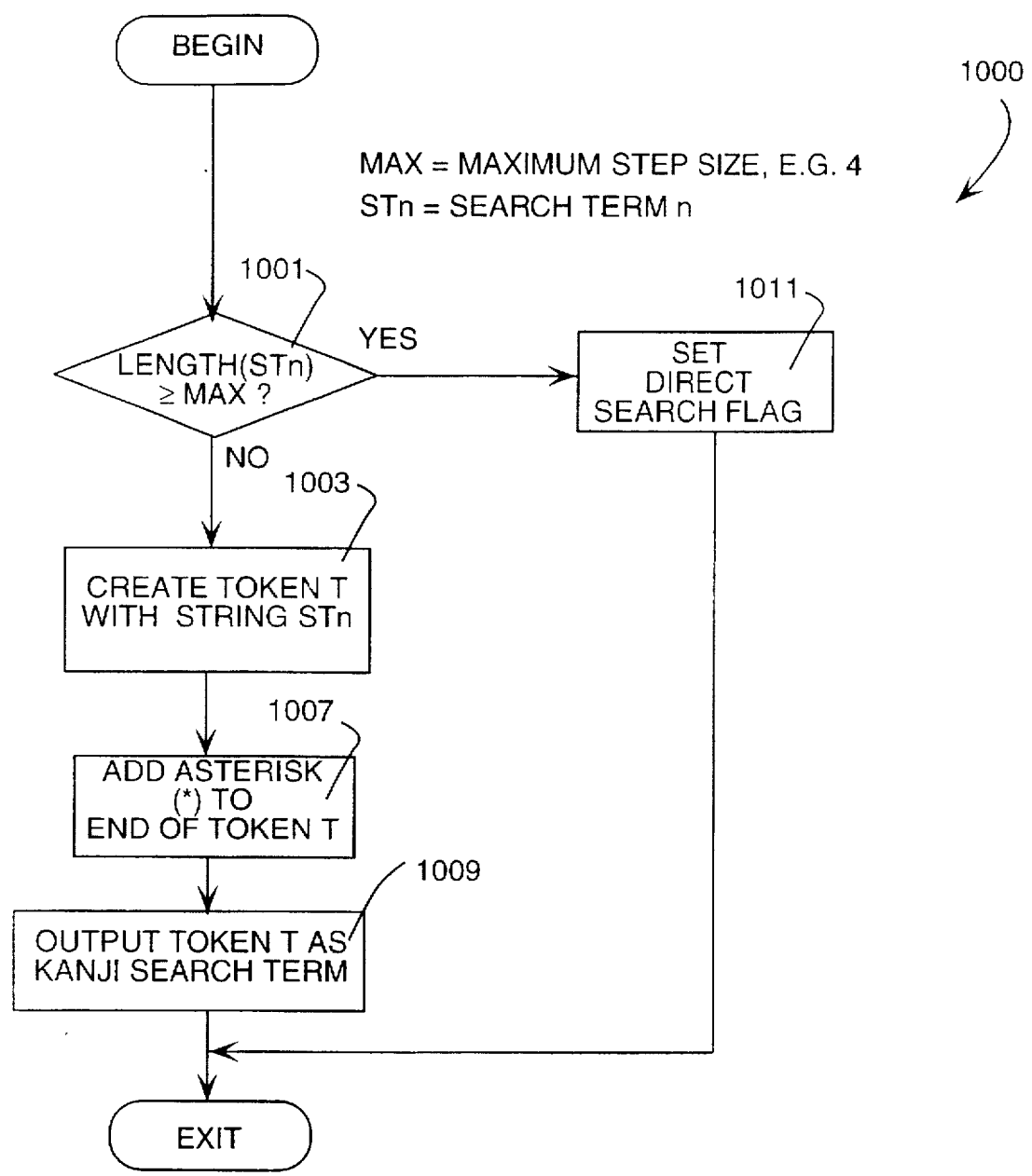
FIG. 10 is a flow diagram of a routine for forming kanji search terms.

FIG. 10 describes a preferred routine 1000 for forming kanji search terms from preliminary search terms. Starting at step 1001, the inquiry is made as to whether the length of the kanji string search term ST is greater than or equal to the maximum step size MAX, which in the preferred embodiment is four. If not, the "no" branch is taken to step 1003 and a token T is created from the search string ST for utilization as the search term in the routine 900. At step 1007, an "*" is added to the end of the token T, and the token T is output as the kanji search term at step 1009 for utilization as the search term.

Thus, for a kanji string, any index term that begins with the search string is considered a match and all of its document associations are returned. This is similar to a search in which the "*" wild card is added to the end of the search string.

There is however, one exception, which is shown taken at step 1001. If the length of the search term entered by the user is greater than the step size MAX, the "yes" branch is taken to step 1011. In this case, the direct search flag is set and the routine exits. A direct search must be conducted in this case because the kanji search string entered by the user is greater than any of the kanji index terms, forcing a direct search.

Figure 11:
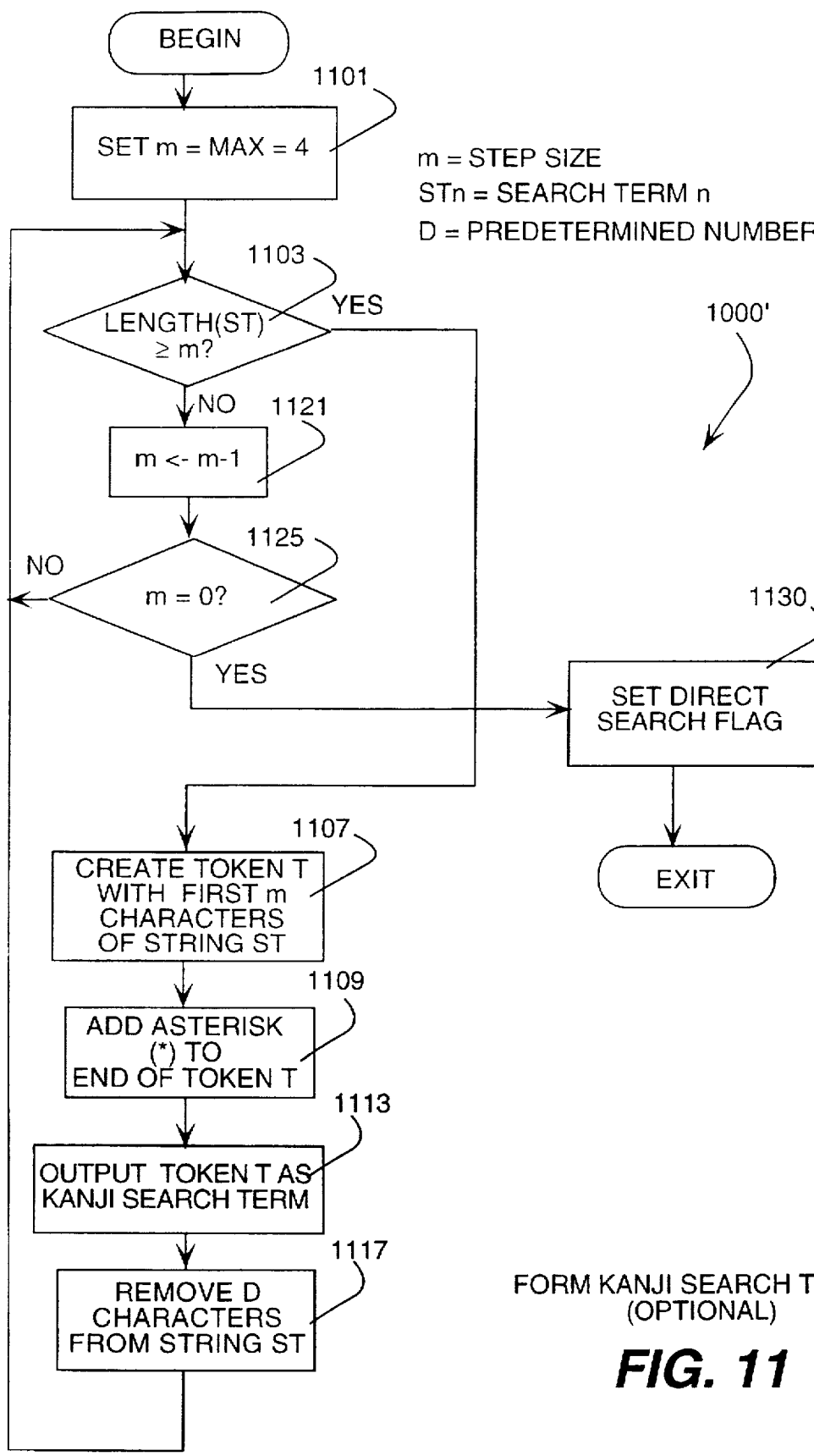
FIG. 11 is a flow diagram of an alternative routine for forming kanji search terms.

Referring now to FIG. 11, kanji search terms can be formed by conducting "step searching" in a manner similar to that described in connection with step indexing as an alternative to the routine shown in FIG. 10. The routine illustrated in FIG. 11 therefore may be considered an alternative kanji search term routine 1000.

Beginning at step 1101, the first step taken to set the maximum step size m equal to MAX (four in the preferred embodiment). The maximum step size should correspond to the maximum step size utilized to construct the index.

At step 1103, the length of the search term ST is compared to m to see if it exceeds the step size. If so, the "yes" branch is taken to step 1107, and a token T is created utilizing the first small m characters of the string ST. At step 1109, an * is added to the end of the token T, and at step 11 13, the token T is provided as the kanji search term. At step 1117, some number, D, of characters from the search string ST is removed, and the program flow branches back to step 1103. D can vary from 1 to the step size or higher. In the current implementation D equals step size. For example, given a Kanji search string represented by "abcdef", the current implementation would "And" together search terms "abcd" and "ef".

If at step 1103 the length of the search term is not greater than m, the "no" branch is taken to step 1121. The variable m is replaced by m−1, and a comparison is made at step 1125 whether m=0. If not, there are more characters remaining in the search string ST and program flow branches back to step 1103.

When the variable m has reached 0 at step 1125, the search string has now been broken into a number of smaller search terms of maximum size MAX, and the "yes" branch is taken to step 1130. At step 1130, the direct search flag is set to force the direct searching of all objects that satisfy the search criteria to locate the objects that satisfy the entire search term ST which is longer than the step size.

The above discussion of embodiments of the methods and systems of the present invention has assumed that the collection of objects is completely indexed by the content-index, or that the direct search flag will force a direct search of certain objects under certain circumstances. One skilled in the art will realize that other embodiments are possible. For example, in one alternative embodiment, the collection of objects is only partially indexed by the content-index. According to this embodiment, there is a content-index inclusion rule that indicates whether a particular object is indexed by the content-index. The portion of the collection indexed is referred to as the domain of the content-index. The methods and systems described above are slightly modified to incorporate partial indexing. In particular, the generation of the initial search result using the content-index is slightly modified.

Specifically, in FIG. 8, the code that generates and displays the search result is modified to preferably first use the content-index to efficiently generate an initial search result and to then directly search the remaining objects in the collection that are not in the domain of the content-index for additional objects that match the search criteria. Then, the code adds the references generated from the direct search to the initial search result. Also, according to this embodiment, it is preferable that a flag be included with each reference in the stored search result to indicate whether the reference was placed in the stored search result as a result of a direct search of the object as opposed to as a result of a search using the content-index. This flag is used for optimization purposes to avoid unnecessary searching of the object in the search result correction routines. One skilled in the art will recognize that the inclusion of such a flag is not necessary and that other implementations of preserving such information are possible.

Further details of partial index searching are described in the referenced "Content Index" patent.

In yet another embodiment, the methods and systems of the present invention take into account that not all possible searches can be solved using a content-index. The searches that can be solved using a content-index depend upon the information stored in the content-index. For example, a search that involves searching for a particular occurrence of a term in a document is typically not solved using a content-index unless occurrence information is also stored in the content-index. The "Advanced Search" button 205 in FIG. 2, for example, could be used to specify such a search criteria.

For example, a content-index such as that described in conjunction with FIG. 3 could store occurrence information for each reference to a document that contains the indexing term. More specifically, in one embodiment, each reference in each leaf structure 309–312 points to a tuple comprising (reference to document, occurrence$_i$, ... occurrence$_n$) where the "reference to document" is the same as that shown in FIG. 3 (e.g., "1") and each occurrence$_i$ is an occurrence indicator (e.g., a number), which indicates the location of the indexing term within the document. An occurrence number could indicate, for example, that the indexing term is the $i^{th}$ word in the document. For example, the tuples (1, 3, 16) and (3, 5) substituted for leaf structure 309 indicate that the indexing term "A" is found in document "1" as the 3rd word and the 16th word and in document "3" as the 5th word.

Alternatively, if the content-index does not store occurrence information, then a search for a particular location or the $i^{th}$ occurrence of a term in a document is not solvable exclusively using that content-index. In this case, the methods and systems of the present invention are modified to incorporate more complex searches.

Figure 12:
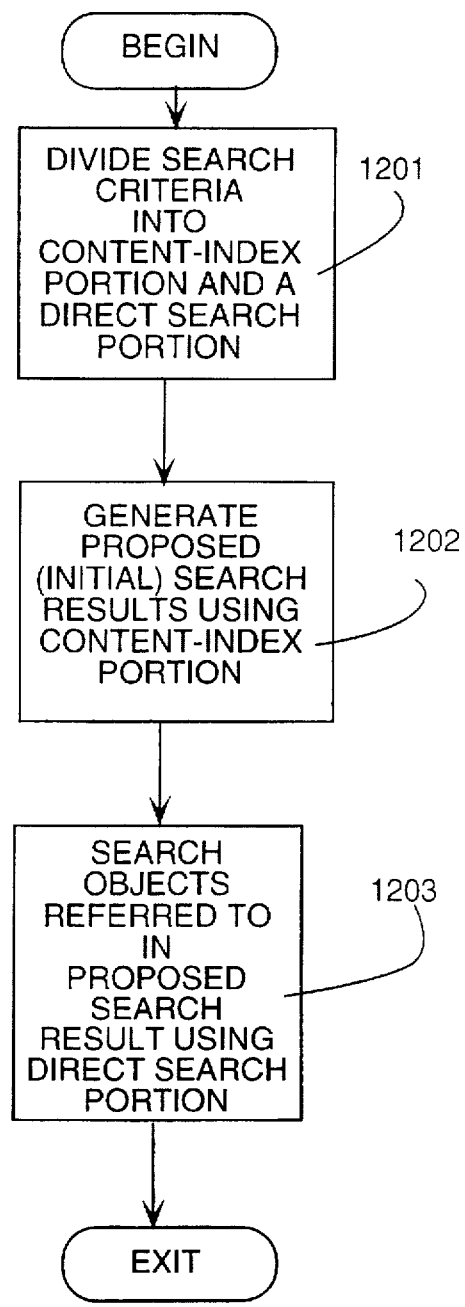
FIG. 12 is a flow diagram of a modification to the content-index search code when used with search criteria that goes beyond a search that can be resolved exclusively using a content-index.

FIG. 12 is a flow diagram of the modifications to the search code of FIG. 8 when used with a search criteria that goes beyond a search solved exclusively using a content-index. Typically, these modifications are employed to implement a direct search operation in response to the state of the direct search flag set in steps shown in FIG. 9. Specifically, in step 1201, the search criteria is divided into a content-index portion, which is the portion of the search that can be performed using a content-index, and a direct search portion, which is the portion of the search that requires searching the object directly to determine whether the content of the object matches the search criteria. According to this embodiment, the logical operator that joins the content-index portion of search criteria and the direct search portion is preferably a conjunction (e.g. a logical AND ). That is, the portion of the search that is not solved using the content-index (the direct search portion) further restricts the results of the search generated using the content-index portion. In step 1202, the routine generates a proposed search result using the content-index portion of the search criteria. In step 1203, the routine directly searches each object referred to by the references in the proposed search result for a match using the direct search portion of the search criteria.

Although the present invention has been disclosed and described in terms of preferred embodiments, it is not intended that the invention be limited to such embodiments. Modifications within the spirit of the invention will be apparent to those skilled in the art. The scope of the present invention is defined by the claims which follow.

What is claimed is:

1. A method in a computer system for generating a search result that identifies objects that satisfy a search criteria, the computer system having a collection of objects and a plurality of terms, each object containing one or more of the terms, the objects being represented in different tyes of symbols in a compound word language such as Japanese or Chinese, the method comprising the computer-implemented steps of:

creating a content-index that contains, for each of the plurality of terms, a reference to each object that contains the term, by:

creating a preliminary index term of a first or second type of symbol for each plurality of terms delimited by a word separator or a character type transition;

for each preliminary index term of the first type, utilizing the preliminary index term as an index term;

for each preliminary index term of the second type, step indexing the symbols in the preliminary index term to create a plurality of index terms of a length equal to or less than a predetermined step size, the plurality of index terms comprising a collection of substrings of symbols selected from the preliminary index term that begins with one of the symbols in the preliminary index term and extends to a length of either the end of the preliminary index term or to the number of symbols of the predetermined step size, whichever is smaller;

creating the content-index by associating the object with each of its index terms; and after creating the content-index, using the content-index to generate the search result.

2. The method of claim 1, further comprising the step of normalizing any two-byte representations of symbols comprising an index term to a single-byte representation.

3. The method of claim 2, wherein the step of normalizing is carried out on the preliminary index terms.

4. The method of claim 1, wherein the object to be indexed is stored in text buffer, and the preliminary index terms are stored in a key buffer.

5. The method of claim 4, wherein the preliminary index terms are represented by a plurality of key buffer entries, wherein each key buffer entry comprises a tuple containing a key length parameter and a key offset parameter relative to the text buffer.

6. The method of claim 1, wherein the preliminary index term of the first type is katakana in a shift-JIS representation.

7. The method of claim 1, wherein the preliminary index term of the first type is roman in a shift-JIS representation.

8. The method of claim 1, wherein the preliminary index term of the second type is kanji in a shift-JIS representation.

9. The method of claim 1, wherein the step of step indexing comprises the steps of:

(a) creating an index term of a length equal to or less than the predetermined step size, beginning with the first symbol in the preliminary index term of the second type and extending for the predetermined step size, (b) eliminating th e first symbol in the preliminary index term to create a reduced preliminary index term, (c) creating an index term of a length equal to predetermined step size, beginning with the first symbol in the reduced preliminary index term of the second type and extending for the predetermined step size, (d) repeating the steps (b) and (c) until the last symbol in the reduced preliminary index term coincides with the last symbol in preliminary index term;

(e) decrementing the predetermined step size;

(f) creating an index term of a length equal to the decremented step size; and (g) repeating the steps (e) and (f) until creating a last index term comprising the last symbol in the preliminary index term.

10. The method of claim 1 wherein the collection of objects comprises a corpus of documents.

11. A method in a computer system for generating a search result that identifies objects that satisfy a search criteria, the computer system having a collection of objects and a plurality of terms, each object containing one or more of the terms, the objects being represented in different types of symbols in a compound word language such as Japanese or Chinese, and an index associating terms and objects, the method comprising the computer-implemented steps of:

receiving a string of text as a preliminary search string;

creating a preliminary search term of a first or second type of symbol for each plurality of terms in the preliminary search string delimited by a word separator or a character type transition;

for each preliminary search term of the first type, utilizing the preliminary search term as a search term;

for each preliminary search term of the second type, step indexing the symbols in the preliminary search term to create a plurality of search terms of a length equal to or less than a predetermined step size, the plurality of search terms comprising a collection of substrings of symbols selected from the preliminary search term that begins with one of the symbols in the preliminary search term and extends to a length of either the end of the preliminary search term or the number of symbols of the predetermined step size, whichever is smaller; and using the search terms in the index to generate the search result.

12. The method of claim 11, further comprising the step of removing Boolean terms from the preliminary search string prior to the step of creating the search terms.

13. The method of claim 11, further comprising the step of normalizing any two-byte representations of symbols comprising a search term to a single-byte representation.

14. The method of claim 11, wherein the preliminary search term of the first type is katakana in a shift-JIS representation.

15. The method of claim 11, wherein the preliminary search term of the first type is roman in a shift-JIS representation.

16. The method of claim 11, wherein the preliminary search term of the second type is kanji in a shift-JIS representation.

17. The method of claim 11, wherein the step of step indexing comprises the steps of:

(a) creating a search term of a length equal to or less than the predetermined step size, beginning with the first symbol in the preliminary search term of the second type and extending for the predetermined step size, (b) eliminating the first symbol in the preliminary search term to create a reduced preliminary search term, (c) creating a search term of a length equal to predetermined step size, beginning with the first symbol in the reduced preliminary search term of the second type and extending for the predetermined step size, (d) repeating the steps (b) and (c) until the last symbol in the reduced preliminary search term coincides with the last symbol in preliminary search term;

(e) decrementing the predetermined step size;

(f) creating a search term of a length equal to the decremented step size; and (g) repeating the steps (e) and (f) until creating a last search term comprising the last symbol in the preliminary search term.

18. A method in a computer system for providing a search result that identifies objects in a compound word language such as Japanese or Chinese that satisfy a search criteria, the objects contained in a collection of objects, the search criteria having a content-index search portion used with a content-index to determine a set of objects of the collection that satisfy the content-index search portion, the search criteria having a direct search portion, the direct search portion further restricting the set of objects that satisfy the content-index search portion in order to satisfy the search criteria, the method comprising the computer-implemented steps of:

receiving a string of text in a compound word language such as Japanese or Chinese as a preliminary search string, the compound word language having symbols of a first type such as kanji, katakana, and roman and symbols of a second type such as hiragana;

creating a preliminary search term for each plurality of terms in the preliminary search string delimited by a word separator or a character type transition;

for each preliminary search term of the first type, utilizing the preliminary search term as a search term in the search criteria;

for each preliminary search term of the second type, setting a direct search indicator;

in response to the direct search indicator, generating a proposed list of references to objects that satisfy the direct search portion of the search criteria by directly searching the collection of objects with the preliminary search term of the second type;

generating a proposed list of references to objects that satisfy the content-index portion of the search criteria by searching the content-index with the search term of the first type; and providing the search result by listing the collection of objects that match the search criteria of the content-index searching and of the direct searching.

19. The method of claim 18, further comprising the step of step indexing the symbols in the preliminary search term to create a plurality of search terms of a length equal to or less than a predetermined step size, the plurality of search terms comprising a collection of substrings of symbols selected from the preliminary search term that begins with one of the symbols in the preliminary search term and extends to a length of either the end of the preliminary search term or the number of symbols of the predetermined step size, whichever is smaller.

20. The method of claim 18, further comprising the step of examining each object in the proposed list of references from the content-index portion to determine whether the object also satisfies the direct search portion.

21. The method of claim 18 wherein the collection of objects is a plurality of documents.

22. The method of claim 18, further comprising the step of:

for each preliminary search term of the second type, setting the direct search indicator if the preliminary search term is longer than a predetermined length, and creating a search term comprising the preliminary search term appended with a wildcard character if the preliminary search term is not longer than the predetermined length.

23. A computer system for generating a search result that identifies objects that satisfy a search criteria, the computer system storing a collection of objects and a plurality of terms, each object containing one or more of the terms, the objects being represented in different types of symbols in a compound word language such as Japanese or Chinese, comprising:

a content-index that contains, for each of the plurality of terms, a reference to each object that contains the term;

a preliminary index term generator that generates, for each plurality of terms delimited by a word separator or a character type transition, a preliminary search term of a first or second type of symbol;

an indexer that, for each preliminary index term of the first type, utilizes the preliminary index term as an index term;

the indexer, for each preliminary index term of the second type, also step indexing the symbols in the preliminary index term to create a plurality of index terms of a length equal to or less than a predetermined step size, the plurality of index terms comprising a collection of substrings of symbols selected from the preliminary index term that begins with one of the symbols in the preliminary index term and extends to a length of either the end of the preliminary index term or the number of symbols of the predetermined step size, whichever is smaller;

an object/index term associator that creates the content-index by associating the object with each of its index terms; and a search engine that, after creating the content-index, uses the content-index to generate the search result.

24. The system of claim 23, further comprising a normalizer that normalizes any two-byte representations of symbols comprising an index term to a single-byte representation.

25. The system of claim 24, wherein the normalizing is carried out on the preliminary index terms.

26. The system of claim 23, further comprising a text buffer, and wherein the object to be indexed is stored in the text buffer, and the preliminary index terms are stored in a key buffer.

27. The system of claim 26, wherein the preliminary index terms are represented by a plurality of key buffer entries, wherein each key buffer entry comprises a tuple containing a key length parameter and a key offset parameter relative to the text buffer.

28. The system of claim 23, wherein the preliminary index term of the first type is katakana in a shift-JIS representation.

29. The system of claim 23, wherein the preliminary index term of the first type is roman in a shift-JIS representation.

30. The system of claim 23, wherein the preliminary index term of the second type is kanji in a shift-JIS representation.

31. The system of claim 23, wherein the indexer is operative for:

(a) creating an index term of a length equal to or less than the predetermined step size, beginning with the first symbol in the preliminary index term of the second type and extending for the predetermined step size, (b) eliminating the first symbol in the preliminary index term to create a reduced preliminary index term, (c) creating an index term of a length equal to predetermined step size, beginning with the first symbol in the reduced preliminary index term of the second type and extending for the predetermined step size, (d) repeating the steps (b) and (c) until the last symbol in the reduced preliminary index term coincides with the last symbol in preliminary index term;

(e) decrementing the predetermined step size;

(f) creating an index term of a length equal to the decremented step size; and (g) repeating the steps (e) and (f) until creating a last index term comprising the last symbol in the preliminary index term.

32. The system of claim 23 wherein the collection of objects comprises a corpus of documents.

33. A computer system for generating a search result that identifies objects that satisfy a search criteria, the computer system storing a collection of objects in a compound word language such as Japanese or Chinese and a plurality of terms, each object containing one or more of the terms, and an index associating terms and objects, comprising the:

an input device for providing a string of text as a preliminary search string;

a preliminary search term generator that generates a kanji preliminary search term for each plurality of kanji terms in the preliminary search string delimited by a word separator or a character type transition;

a search term generator that provides, for each kanji preliminary search term, a plurality of search terms of a length equal to or less than a predetermined step size by step indexing the symbols in the preliminary kanji search term, the plurality of search terms comprising a collection of substrings of symbols selected from the preliminary kanji search term that begins with one of the symbols in the preliminary kanji search term and extends to a length of either the end of the preliminary kanji search term or the number of symbols of the predetermined step size, whichever is smaller; and a search engine that uses the search terms in the index to generate the search result.

34. The system of claim 33, further comprising a filter for removing Boolean terms from the preliminary search string prior to the step of creating the search terms.

35. The system of claim 33, further comprising a normalizer for normalizing any two-byte representations of symbols comprising a search term to a single-byte representation.

36. The system of claim 33, wherein the indexer is operative for step indexing by:
   (a) creating a search term of a length equal to or less than the predetermined step size, beginning with the first symbol in the kanji preliminary search term of the second type and extending for the predetermined step size,
   (b) eliminating the first symbol in the kanji preliminary search term to create a reduced kanji preliminary search term,
   (c) creating a search term of a length equal to predetermined step size, beginning with the first symbol in the reduced kanji preliminary search term of the second type and extending for the predetermined step size,
   (d) repeating the steps (b) and (c) until the last symbol in the reduced kanji preliminary search term coincides with the last symbol in kanji preliminary search term;
   (e) decrementing the predetermined step size;
   (f) creating a search term of a length equal to the decremented step size; and
   (g) repeating the steps (e) and (f) until creating a last search term comprising the last symbol in the kanji preliminary search term.

37. A computer system for providing a search result that identifies objects n a compound word language such as Japanese or Chinese that satisfy a search criteria, the objects contained in a collection of objects, the search criteria having a content-index search portion used with a content-index to determine a set of objects of the collection that satisfy the content-index search portion, the search criteria having a direct search portion, the direct search portion further restricting the set of objects that satisfy the content-index search portion in order to satisfy the search criteria, comprising:
   an input device for providing a string of text in a compound word language such as Japanese or Chinese as a preliminary search string, the compound word language having symbols of a first type such as kanji, katakana, and roman and symbols of a second type such as hiragana;
   a preliminary search term generator for creating a preliminary search term for each plurality of terms in the preliminary search string delimited by a word separator or a character type transition;
   a search term generator that, for each preliminary search term of the first type, utilizes the preliminary search term as a search term in the search criteria;
   the search term generator, for each preliminary search term of the second type, setting a direct search indicator;
   a search engine that, in response to the direct search indicator, generates a proposed list of references to objects that satisfy the direct search portion of the search criteria by directly searching the collection of objects with the preliminary search term of the second type;
   the search engine also generating a proposed list of references to objects that satisfy the content-index portion of the search criteria by searching the content-index with the search term of the first type; and
   an output device that provides the search results by listing the collection of objects that match the search criteria of the content-index searching and of the direct searching.

38. The system of claim 37, further comprising a step indexer for providing the symbols in the preliminary search term as a plurality of search terms of a length less than a predetermined step size, the plurality of search terms comprising a collection of substrings of symbols selected from the preliminary search term that begins with one of the symbols in the preliminary search term and extends to a length of either the end of the preliminary search term or the number of symbols of the predetermined step size, whichever is smaller.

39. The system of claim 37, further comprising a component in the search engine for examining each object in the proposed list of references from the content-index portion to determine whether the object also satisfies the direct search portion.

40. The system of claim 37, wherein the collection of objects is a plurality of documents.

41. The system of claim 37, wherein the search term generator is operative for:
   for each preliminary search term of the second type, setting the direct search indicator if the preliminary search term is longer than a predetermined length, and
   creating a search term comprising the preliminary search term appended with a wildcard character if the preliminary search term is not longer than the predetermined length.

* * * * *

UNITED STATES PATENT AND TRADEMARK OFFICE
CERTIFICATE OF CORRECTION

PATENT NO. : 5,778,361

DATED : July 7, 1998

INVENTOR(S) : Nanjo et al.

It is certified that error appears in the above-identified patent and that said Letters Patent is hereby corrected as shown below:

Col. 25, line 26, after the word "objects" delete the letter "n" and insert the word – in – in place there of.

Signed and Sealed this

Thirtieth Day of November, 1999

Attest:

Attesting Officer

Q. TODD DICKINSON

Acting Commissioner of Patents and Trademarks